(12) United States Patent
Uehara et al.

(10) Patent No.: US 8,407,391 B2
(45) Date of Patent: Mar. 26, 2013

(54) COMPUTER SYSTEM MANAGING I/O PATH AND PORT

(75) Inventors: Keitaro Uehara, Kokubunji (JP); Takashige Baba, Inagi (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 12/789,865

(22) Filed: May 28, 2010

(65) Prior Publication Data
US 2010/0312943 A1 Dec. 9, 2010

(30) Foreign Application Priority Data
Jun. 4, 2009 (JP) .................. 2009-134682

(51) Int. Cl.
*G06F 13/00* (2006.01)
*G06F 11/00* (2006.01)
(52) U.S. Cl. ............ 710/316; 714/4.1; 714/4.2; 714/4.5
(58) Field of Classification Search .................. 710/316; 714/4.1, 4.2, 4.5
See application file for complete search history.

(56) References Cited

U.S. PATENT DOCUMENTS

| | | | |
|---|---|---|---|
| 6,345,346 B1 * | 2/2002 | Biessener et al. ............. | 711/162 |
| 6,392,989 B1 * | 5/2002 | Jardetzky et al. ............ | 370/216 |
| 6,823,418 B2 | 11/2004 | Langendorf et al. | |
| 6,850,527 B1 * | 2/2005 | Moniot ........................ | 370/399 |
| 6,990,563 B2 * | 1/2006 | Biessener et al. ............. | 711/162 |
| 7,043,575 B2 | 5/2006 | Stephan | |
| 7,809,977 B2 | 10/2010 | Takamoto | |
| 7,827,258 B1 | 11/2010 | Kalbarga | |
| 7,835,380 B1 | 11/2010 | Aloni et al. | |
| 7,890,669 B2 | 2/2011 | Uehara et al. | |
| 7,991,839 B2 | 8/2011 | Freimuth et al. | |
| 8,190,769 B1 * | 5/2012 | Shukla et al. ................. | 709/238 |
| 8,208,370 B1 * | 6/2012 | Mitchell et al. ............... | 370/217 |
| 2003/0012204 A1 * | 1/2003 | Czeiger et al. ................ | 370/401 |
| 2003/0137933 A1 * | 7/2003 | Yamada et al. ............... | 370/225 |

(Continued)

FOREIGN PATENT DOCUMENTS

| | | | |
|---|---|---|---|
| JP | 10154037 A | * | 6/1998 |
| JP | 2006004381 | | 5/2006 |

(Continued)

OTHER PUBLICATIONS

PCI-SIG, Multi-Root I/O Virtualization and Sharing Specification Rev. 1.0, May 2008, p. 109-222, URL: http://www.pcisig.com/specifications/iov/multi-root/.*

(Continued)

*Primary Examiner* — Faisal M Zaman
(74) *Attorney, Agent, or Firm* — Mattingly & Malur, PC

(57) ABSTRACT

It is provided a computer system comprising a plurality of computers; a PCI switch; and a plurality of I/O devices connected to the PCI switch, wherein the communication path includes a virtual switch and virtual bridges, and the PCI switch comprises a communication path generating module for setting the virtual switches and the virtual bridges, a virtual switch group management module for creating a virtual switch group including the at least one of the virtual switches, and setting an enabled flag to one of the virtual switches included in the virtual switch group, and a port management module for managing relation between each of the generated communication paths and the plurality of ports included in the each of the generated communication paths.

15 Claims, 27 Drawing Sheets

U.S. PATENT DOCUMENTS

| | | | |
|---|---|---|---|
| 2004/0103210 A1* | 5/2004 | Fujii et al. | 709/239 |
| 2006/0130137 A1 | 6/2006 | Wewel et al. | |
| 2006/0239287 A1* | 10/2006 | Johnsen et al. | 370/412 |
| 2006/0277348 A1 | 12/2006 | Wooten | |
| 2007/0165596 A1 | 7/2007 | Boyd et al. | |
| 2007/0226532 A1* | 9/2007 | Matsuda | 714/4 |
| 2008/0040526 A1* | 2/2008 | Suzuki et al. | 710/302 |
| 2008/0117907 A1* | 5/2008 | Hein | 370/392 |
| 2008/0137677 A1* | 6/2008 | Boyd et al. | 370/419 |
| 2008/0162800 A1 | 7/2008 | Takashige et al. | |
| 2008/0183968 A1 | 7/2008 | Huang | |
| 2008/0235430 A1* | 9/2008 | Boyd et al. | 710/316 |
| 2008/0240134 A1* | 10/2008 | Gregg | 370/402 |
| 2008/0250186 A1 | 10/2008 | Suzuki et al. | |
| 2009/0187694 A1* | 7/2009 | Baba et al. | 710/316 |
| 2009/0187754 A1 | 7/2009 | Hwang | |
| 2009/0265501 A1* | 10/2009 | Uehara et al. | 710/312 |
| 2010/0036995 A1 | 2/2010 | Nakayama et al. | |
| 2010/0082874 A1 | 4/2010 | Baba et al. | |
| 2010/0091976 A1* | 4/2010 | Boucadair | 379/221.03 |
| 2010/0106884 A1 | 4/2010 | Abraham et al. | |
| 2010/0153615 A1* | 6/2010 | Baba et al. | 710/316 |
| 2010/0211717 A1* | 8/2010 | Uehara et al. | 710/316 |
| 2010/0257302 A1* | 10/2010 | Suzuki et al. | 710/314 |
| 2011/0004688 A1* | 1/2011 | Matthews et al. | 709/226 |
| 2011/0016235 A1 | 1/2011 | Brinkmann et al. | |
| 2011/0185163 A1* | 7/2011 | Hidaka | 713/2 |
| 2011/0249551 A1* | 10/2011 | Rollins | 370/222 |
| 2012/0233492 A1* | 9/2012 | Finn et al. | 714/4.1 |

FOREIGN PATENT DOCUMENTS

| | | | |
|---|---|---|---|
| JP | 2007195166 | | 8/2007 |
| JP | 2008171413 | | 7/2008 |
| JP | 2008310489 | | 12/2008 |
| JP | 2009258978 A | * | 11/2009 |
| JP | 2010191814 A | * | 9/2010 |
| JP | 2010282387 A | * | 12/2010 |
| WO | WO 2010025127 A1 | * | 3/2010 |
| WO | WO 2010044409 A1 | * | 4/2010 |

OTHER PUBLICATIONS

"IEEE Draft Standard for Local and Metropolitan Area Networks—Virtual Bridged Local Area Networks—Amendment: Provider Backbone Bridge Traffic Engineering (Draft Amendment to IEEE Std 802.1Q-2005)," IEEE Unapproved Draft Std P802-1Qay/D5-0, Jan 9, 2009.*

Feng Xu; Das, T.; Min Peng; Ghani, N.; , "Evaluation of post-fault restoration strategies in multi-domain networks," Advanced Networks and Telecommunication Systems (ANTS), 2010 IEEE 4th International Symposium on, pp. 43-45, Dec. 16-18, 2010.*

Baker, Z.K.; Gokhale, M.; , "On the Acceleration of Shortest Path Calculations in Transportation Networks," Field-Programmable Custom Computing Machines, 2007. FCCM 2007. 15th Annual IEEE Symposium on, pp. 23-34, Apr. 23-25, 2007.*

J. Regula, Using Non-transparent Bridging in PCI Express Systems, Jun. 2004, PLX Technology, Inc., pp. 24-27, URL: http://www.plxtech.com/pdf/technical/expresslane/NontransparentBridging.pdf.

K. Uehara et al., U.S. Appl. 12/709,405, filed Feb. 19, 2010 entitled Computer System, Method of Managing PCI Switch, and Managment Server.

JP Office Action in JP Application No. 2009-134682, dated May 22, 2012.

* cited by examiner

| ABBREVIATION | FUNCTION TYPE | INCLUDED FUNCTION | MODE OF USE |
|---|---|---|---|
| BF | BASE FUNCTION | INCLUDING MR-IOV CAPABILITY | USED WHEN PCI MANAGER SETS VH ALLOCATION |
| PF | PHYSICAL FUNCTION | INCLUDING SR-IOV CAPABILITY | USED WHEN HOST OS OR HYPERVISOR SETS VF ALLOCATION TO GUEST |
| VF | VIRTUAL FUNCTION | INCLUDING VIRTUAL ADAPTER | VIRTUAL ADAPTER ALLOCATED TO GUEST OS |

650 HOST-DEVICE ALLOCATION TABLE

| MANAGER HOST | HOST | DEVICE | VHN |
|---|---|---|---|
| ACTIVE | HOST X 100a | DEVICE A 300a | 0 |
| | | DEVICE B 300b | 0 |
| | | DEVICE C 300c | 0 |
| | | DEVICE D 300d | 0 |
| BACKUP | HOST Y 100b | DEVICE A 300a | 0 |
| | | DEVICE B 300b | 0 |
| | | DEVICE C 300c | 0 |
| | | DEVICE D 300d | 0 |
| - | HOST Z 100c | DEVICE A 300a | 1 |
| | | DEVICE B 300b | 1 |
| - | HOST W 100d | DEVICE B 300b | 2 |
| | | DEVICE C 300c | 1 |
| | | DEVICE D 300d | 1 |

650 HOST-DEVICE ALLOCATION TABLE

| MANAGER HOST | HOST | DEVICE | VHN |
|---|---|---|---|
| ACTIVE →BACKUP | HOST X 100a | DEVICE A 300a | 0 |
| | | DEVICE B 300b | 0 |
| | | DEVICE C 300c | 0 |
| | | DEVICE D 300d | 0 |
| BACKUP →ACTIVE | HOST Y 100b | DEVICE A 300a | 0 |
| | | DEVICE B 300b | 0 |
| | | DEVICE C 300c | 0 |
| | | DEVICE D 300d | 0 |
| - | HOST Z 100c | DEVICE A 300a | 1 |
| | | DEVICE B 300b | 1 |
| - | HOST W 100d | DEVICE B 300b | 2 |
| | | DEVICE C 300c | 1 |
| | | DEVICE D 300d | 1 |

COMPUTER SYSTEM MANAGING I/O PATH AND PORT

CLAIM OF PRIORITY

The present application claims priority from Japanese patent application JP 2009-134682 filed on Jun. 4, 2009, the content of which is hereby incorporated by reference into this application.

CROSS-REFERENCES TO RELATED APPLICATIONS

This application claims the benefit of the following applications filed in the United States Patent and Trademark Office, U.S. patent application Ser. No. 12/546,264 entitled "COMPUTER SYSTEM AND METHOD FOR SHARING PCI DEVICES THEREOF", filed on Aug. 24, 2009, and U.S. patent application Ser. No. 12/709,405 entitled "COMPUTER SYSTEM, METHOD OF MANAGING PCI SWITCH, AND MANAGEMENT SERVER", filed on Feb. 19, 2010, the disclosures of all of which are herein incorporated by reference in their entireties.

BACKGROUND OF THE INVENTION

This invention relates to a multi-computer system in which a plurality of computers and a plurality of PCI devices are connected by a PCI switch, and more particularly, to enhancing the reliability of a multi-root PCI switch.

In recent years, blade servers which house a plurality of computers in a single machine have been put into use in order to facilitate server management. Further, improvement in processing performance of CPUs brought about by a multi-core technology, which gives a CPU a plurality of processor cores, has led to widespread use of a virtual server technology, which uses a CPU efficiently by running a plurality of virtual servers on a single computer.

While the CPU performance has improved, there has been a shortage of I/O devices which require connectors and ports for input and output. In order to remedy the shortage of I/O devices, there is known a method of enhancing the extensibility and flexibility of I/O devices with the use of a PCI switch technology.

In order to enhance the reliability of this type of server system where components are connected via a PCI switch, the system needs to be built in a manner that prevents a failure in a single device or server from affecting the entire system (in a manner that avoids single point of failure (SPOF)), which includes preparing redundant paths and setting up failover to a backup system.

For instance, there is a method in which two PCI switches are connected to each other, which normally allow the switches' respective hosts to access assigned devices, and in the event of a host failure, the connection is switched to cascade connection to allow one of the hosts to access all devices as described in, for example, US 2008/0240134 A1. With this method, however, dealing with a failure requires the re-assigning of bus numbers and similar procedures that make it difficult to execute failover while the devices are running.

Non-transparent bridging may be used in configuring a PCI switch that connects a plurality of hosts as described in, for example, an article by Jack Regula titled "Using Non-transparent Bridging in PCI Express Systems," June 2004, pp. 24-27. A non-transparent bridge is a bridge that combines two PCI-PCI bridges to connect two PCI bus trees to each other. This bridge is recognized by each host as an end point, and when a memory is accessed via a base address register (BAR), the address is converted to forward the access to the other PCI bus tree. With this method, however, switching hosts is inevitably accompanied by resetting and re-initialization.

The PCI-SIG, which is the PCI Special Interest Group, defines multi-root I/O virtualization (MR-IOV) standards, which extend a PCI switch used by a conventional single server such that a plurality of computers are connected to a plurality of peripheral component interconnect (PCI) devices (or PCIe(xpress) devices) which are I/O devices as described in, for example, an online document "Multi-Root I/O Virtualization and Sharing Specification Rev1.0" published by PCI-SIG in May 2008, pp. 109-222.

A device compliant with the MR-IOV standards (MR device) has a plurality of virtual hierarchy (VH) layers each of which is allocated to a virtual switch configured from a switch compliant with the MR-IOV standards (MR switch). A single MR device is thus shared by a plurality of server hosts and used concurrently by the server hosts.

According to the MR-IOV standards, management software called a PCI manager is used to manage the configuration information of MR switches and MR devices. The PCI manager itself uses a management virtual switch called VH0 (management virtual switch VH0) for settings in the MR switches and the MR devices.

Every MR switch and every MR device that is managed by the PCI manager is connected to the management virtual switch VH0, and the virtual hierarchy layer VH0 in the MR device holds a special function for management (base function: BF). A host that includes the management virtual switch VH0 (hereinafter, may also be referred to as manager host) can therefore present a single point of failure.

When a failure occurs in the manager host, the BF of an MR device that is managed by the manager host is reset. Resetting the BF deletes configuration information in which the MR device is partitioned on a VH basis and accordingly affects all hosts that have been sharing and using this MR device. Also in the case where the shutting down of the manager host is scheduled for planned maintenance or firmware update and the configuration information is migrated to another host, the manager host cannot be shut down without affecting hosts that are using an MR device managed by the manager host.

SUMMARY OF THE INVENTION

The MR-IOV standards do not define failover of the management virtual switch VH0 as described above. Switching between virtual switches in accordance with the MR-IOV standards is accomplished by such methods as (1) dynamically changing a port connection between virtual switches and (2) changing a virtual switch connection through hotplug.

However, in both the methods (1) and (2) described above, there is a period in which virtual switches (virtual bridges that constitute the virtual switches) and ports are disconnected from each other, and the instant the disconnection occurs, the event is regarded as a link down and the BF of every relevant MR device is reset. The goal of "switching the management virtual switch VH0 without affecting other hosts that are using the MR device" is therefore not achieved with the methods (1) and (2).

A representative aspect of this invention is as follows. That is, there is provided a computer system, comprising: a plurality of computers each comprising a processor, a memory connected to the processor, and an interface connected to the processor; a PCI switch which is connected to each of the plurality of computers via the interface; and a plurality of I/O devices which are connected to the PCI switch. The PCI switch comprises: a plurality of ports to which one of the plurality of computers and the plurality of I/O devices are connected; and a switch management module for setting a communication path for connecting one of the plurality of computers and one of the plurality of I/O devices. The communication path includes at least one of virtual switches and a plurality of virtual bridges, the at least one of virtual switches constituting paths including the communication paths which connect the one of the plurality of virtual bridges to each other, each of the plurality of virtual bridges connecting the one of the virtual switches and one of the plurality of ports. The switch management module comprises: a communication path generating module for setting the plurality of virtual switches and the plurality of virtual bridges to generate at least one of the communication paths from the set one of the virtual switches and from the set one of the plurality of virtual bridges; a virtual switch group management module for creating a virtual switch group including the at least one of the plurality of virtual switches, and setting an enabled flag to one of the plurality of virtual switches included in the virtual switch group to indicate that connection with one of the plurality of ports is enabled; and a port management module for managing relation between each of the generated communication paths and at least one of the plurality of ports included in the each of the generated communication paths based on settings of the communication path generating module and settings of the virtual switch group management module.

The multiple virtual switches are provided, and switching between the virtual switches can be made without resetting any relevant I/O device, which prevents an active computer from presenting the single point of failure. A computer system that is highly reliable overall can thus be built.

BRIEF DESCRIPTION OF THE DRAWINGS

The present invention can be appreciated by the description which follows in conjunction with the following figures, wherein:

FIGS. 18 and 19 are explanatory diagrams illustrating a user-operated interface for manipulating the host-device allocation table by calling up the PCI manager through the management console according to the first embodiment of this invention;

DETAILED DESCRIPTION OF THE PREFERRED EMBODIMENTS

Embodiments of this invention are described below with reference to the accompanying drawings.

First Embodiment

Figure 1:
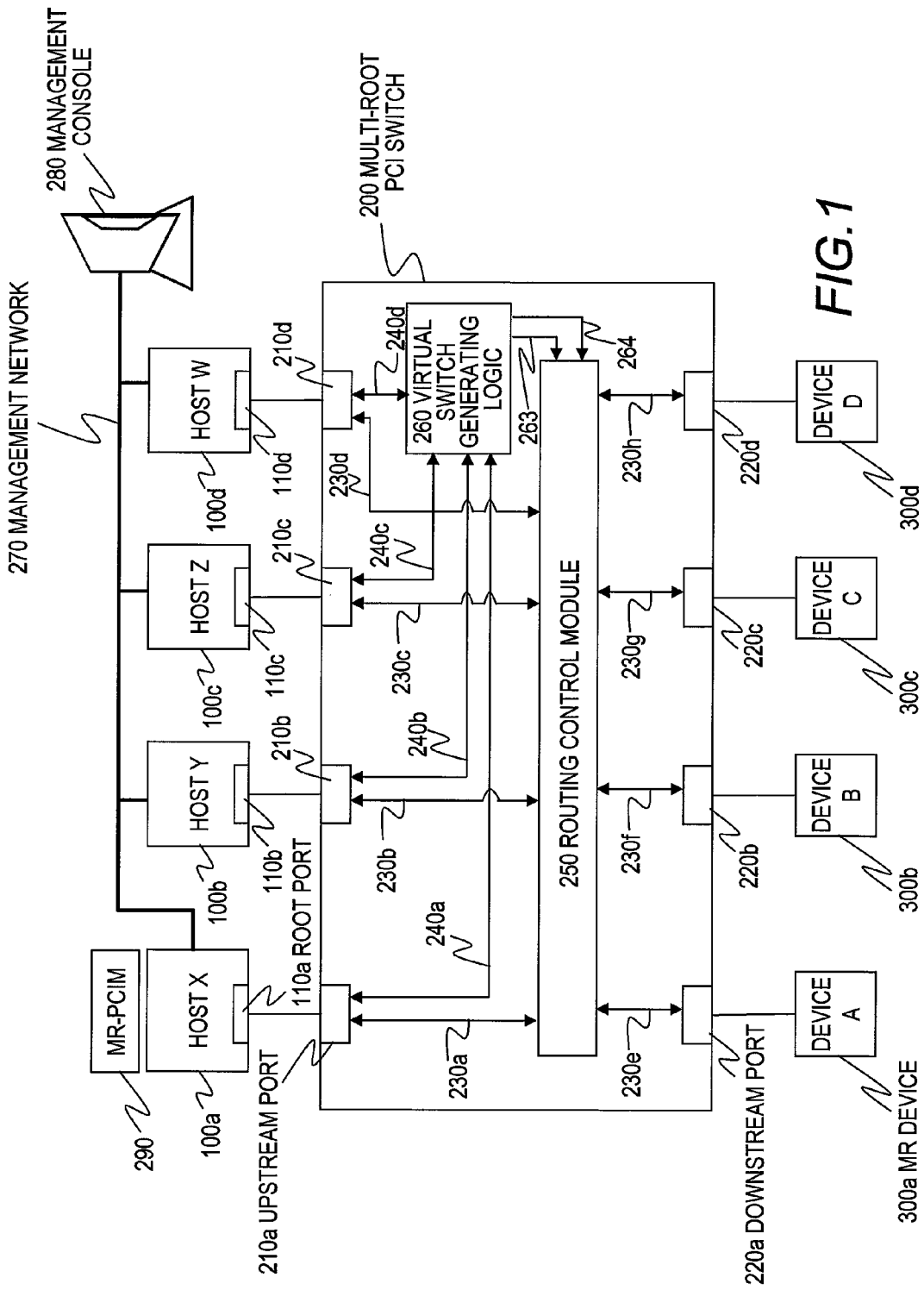
FIG. 1 is a block diagram illustrating an example of a configuration of a computer system according to a first embodiment of this invention.

FIG. 1 is a block diagram illustrating an example of a configuration of a computer system according to a first embodiment of this invention.

The computer system includes hosts 100a to 100d, multi-root I/O devices (hereinafter, also referred to as MR devices) 300a to 300d, which are used by the hosts 100a to 100d, and a multi-root PCI switch 200, which connects the hosts 100a to 100d and the MR devices 300a to 300d to each other.

When there is no particular need to distinguish one from another, the hosts 100a to 100d are each referred to as host 100 and the MR devices 300a to 300d are each referred to as MR device 300.

A PCI manager 290 (MR-PCIM in FIG. 1) which manages the multi-root PCI switch 200 and the MR devices 300 is run on the host 100a.

The hosts 100a to 100d are connected to one another via a management network 270. A management console 280 is connected to the management network 270, enabling an administrator to manage the PCI manager 290 through the management console 280.

The multi-root PCI switch 200 includes four upstream ports 210a to 210d and four downstream ports 220a to 220d. When there is no particular need to distinguish one from another in the following description, the upstream ports 210a to 210d are each referred to as upstream port 210 and the downstream ports 220a to 220d are each referred to as downstream port 220.

The upstream ports 210a to 210d are connected to the hosts 100a to 100d, respectively. Specifically, the upstream ports 210a to 210d are connected to root ports 110a to 110d of the hosts 100a to 100d, respectively. The downstream ports 220a to 220d are connected to the MR devices 300a to 300d, respectively.

The multi-root PCI switch 200 includes a virtual switch generating logic 260 and a routing control module 250.

Figure 5:
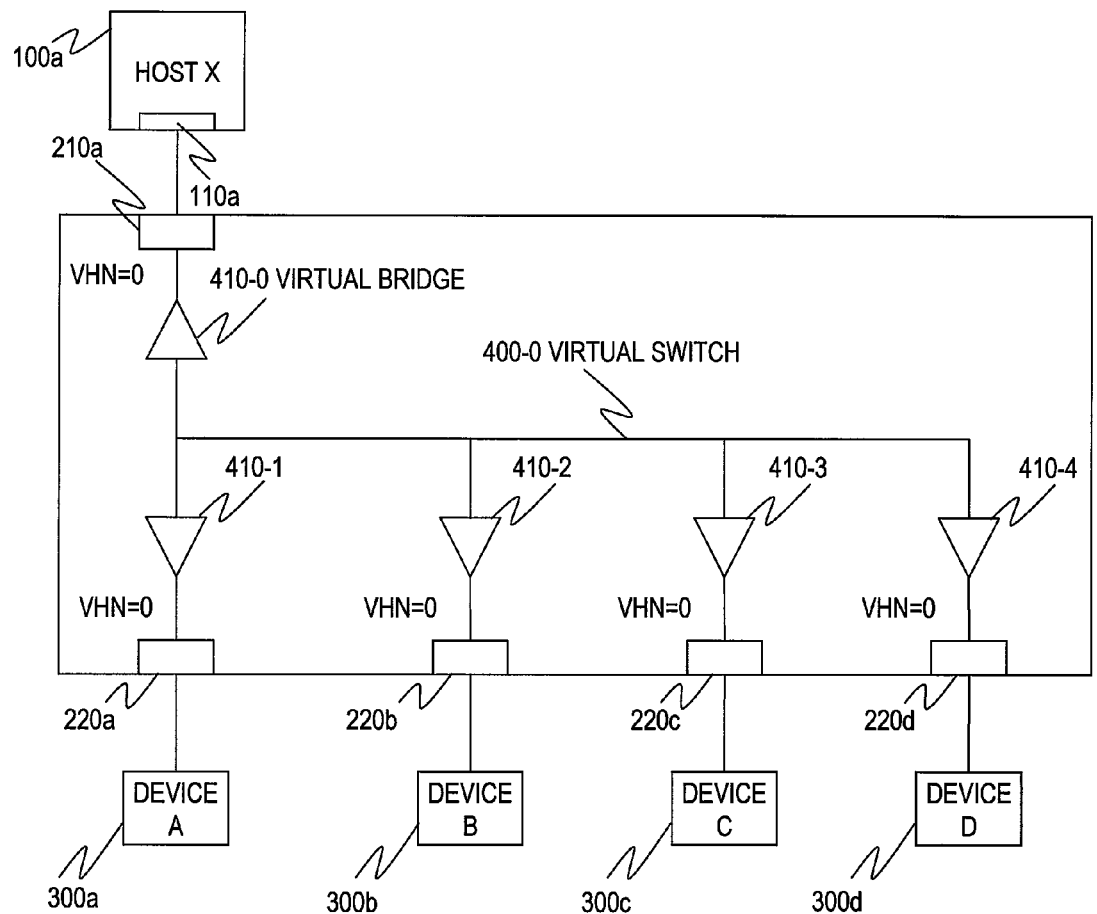
FIG. 5 is an explanatory diagram illustrating the configuration of a virtual switch that has the host X at the top according to the first embodiment of this invention.

The virtual switch generating logic 260 determines settings relevant to virtual switches 400 illustrated in FIG. 5 and generates the virtual switches 400. Details of the virtual switch generating logic 260 are described later with reference to FIG. 14.

The routing control module 250 routes packets input from the ports 210 and 220 in accordance with settings determined by the virtual switch generating logic 260, specifically, port mapping information 263 and virtual switch configuration information 264 which are input from the virtual switch generating logic 260.

The routing control module 250 is connected to the upstream ports 210a to 210d and to the downstream ports 220a to 220d via internal buses 230e to 230h, respectively. The virtual switch generating logic 260 is connected to the upstream ports 210a to 210d via switch management paths 240a to 240d (240), respectively.

Figure 2:
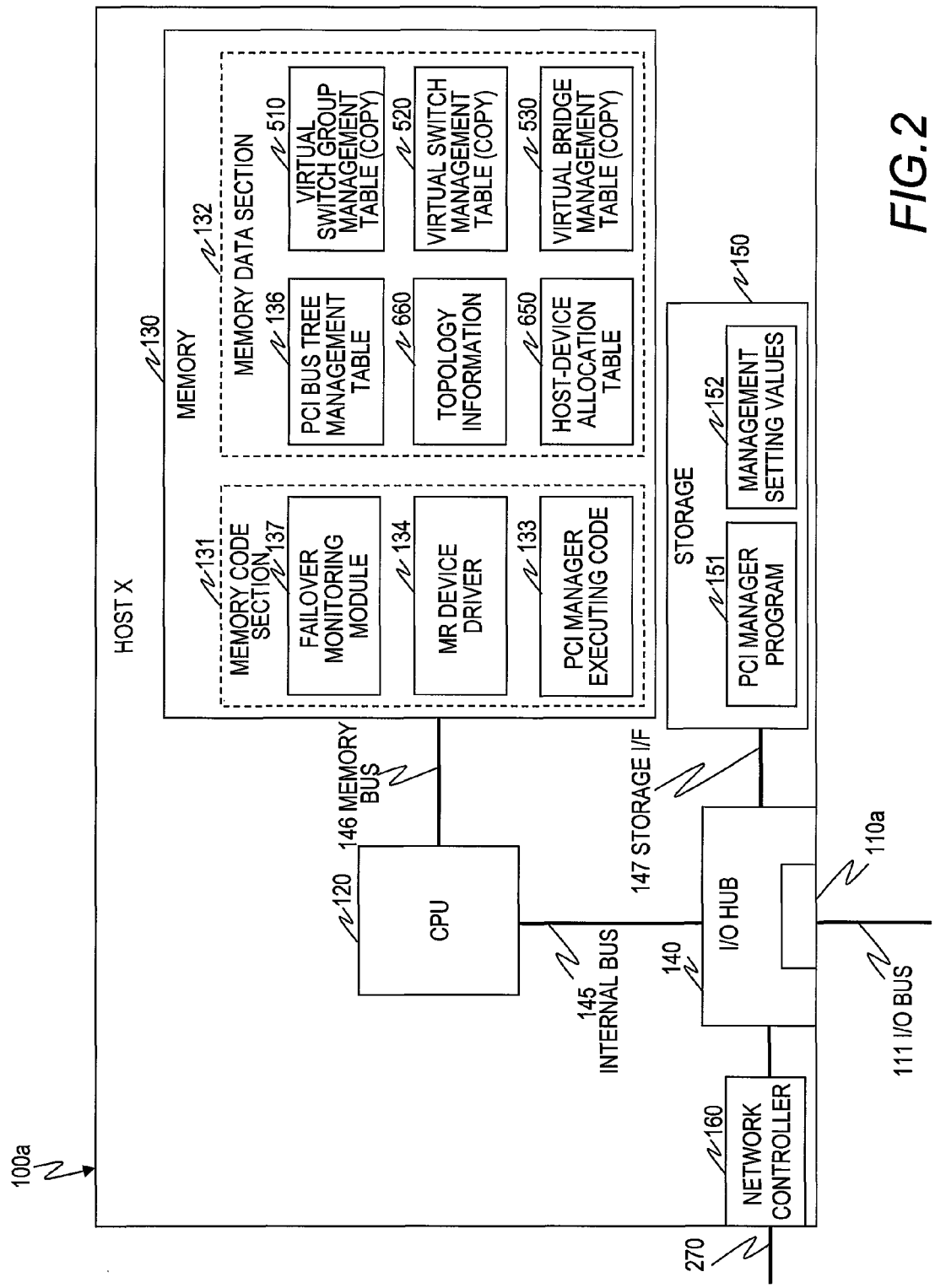
FIG. 2 is a block diagram illustrating the internal configuration of the host computers according to the first embodiment of this invention.

FIG. 2 is a block diagram illustrating the internal configuration of the hosts 100a to 100d according to the first embodiment of this invention. While FIG. 2 illustrates the internal configuration of the host 100a, the other hosts 100b to 100d have the same configuration as that of the host 100a.

The host 100a includes a CPU 120, which performs computing, a memory 130, an I/O hub 140, and a storage 150. The CPU 120 executes a program deployed in the memory 130.

The CPU 120 and the memory 130 are connected to each other via a memory bus 146. The CPU 120 and the I/O hub 140 are connected to each other via an internal bus 145. The host 100a may alternatively be configured such that the I/O hub 140 is replaced by a chipset with a built-in memory controller, and the memory bus 146 is connected to the chipset. The following description applies to either configuration.

The I/O hub 140 includes a root port 110a, which is connected to the multi-root PCI switch 200 via an I/O bus 111.

The host 100a has one I/O hub 140 and one root port 110a in the example of FIG. 2 for simpler illustration, but may have a plurality of I/O hubs 140 and a plurality of root ports 110a.

The I/O hub 140 is connected to the storage 150 via a storage I/F 147. The storage 150 is a medium that stores non-volatile information, such as a hard disk drive or a non-volatile memory.

The storage 150 stores an OS and other components necessary for boot-up, a PCI manager program 151, and management setting values 152.

The memory 130 after boot-up is partitioned into a memory code section 131 and a memory data section 132.

The PCI manager program 151 is deployed in the memory 130 as a PCI manager executing code 133, and executed by the CPU 120. An MR device driver 134 is deployed in the memory 130 and executed by the CPU 120 when the MR device driver 134 needs to be executed in order to enable the multi-root PCI switch 200 to execute processing unique to the respective MR devices 300.

The memory code section 131 may store a failover monitoring module 137. The failover monitoring module 137 monitors the host 100a for a failure and, in the event of a failure, executes failover to one of the other hosts 100b to 100d. Details of the processing executed by the failover monitoring module 137 are described later with reference to FIG. 21.

The memory data section 132 stores a PCI bus tree management table 136, a virtual switch group management table 510, a virtual switch management table 520, a virtual bridge management table 530, a host-device allocation table 650, and topology information 660.

The PCI bus tree management table 136 is described later with reference to FIGS. 16 and 17.

The virtual switch group management table 510, the virtual switch management table 520, and the virtual bridge management table 530 are respective copies of a virtual switch group management table 510, a virtual switch management table 520, and a virtual bridge management table 530 that the virtual switch generating logic 260 stores. The virtual switch group management table 510, the virtual switch management table 520, and the virtual bridge management table 530 are described later with reference to FIGS. 12 and 13.

The host-device allocation table 650 is described later with reference to FIGS. 18 and 19. The topology information 660 is described later with reference to FIG. 27.

The host 100a is connected to the management network 270 via a network controller 160.

(Virtual Hierarchy of MR Devices and Virtual Switch Configuration)

Figures 3, 4:
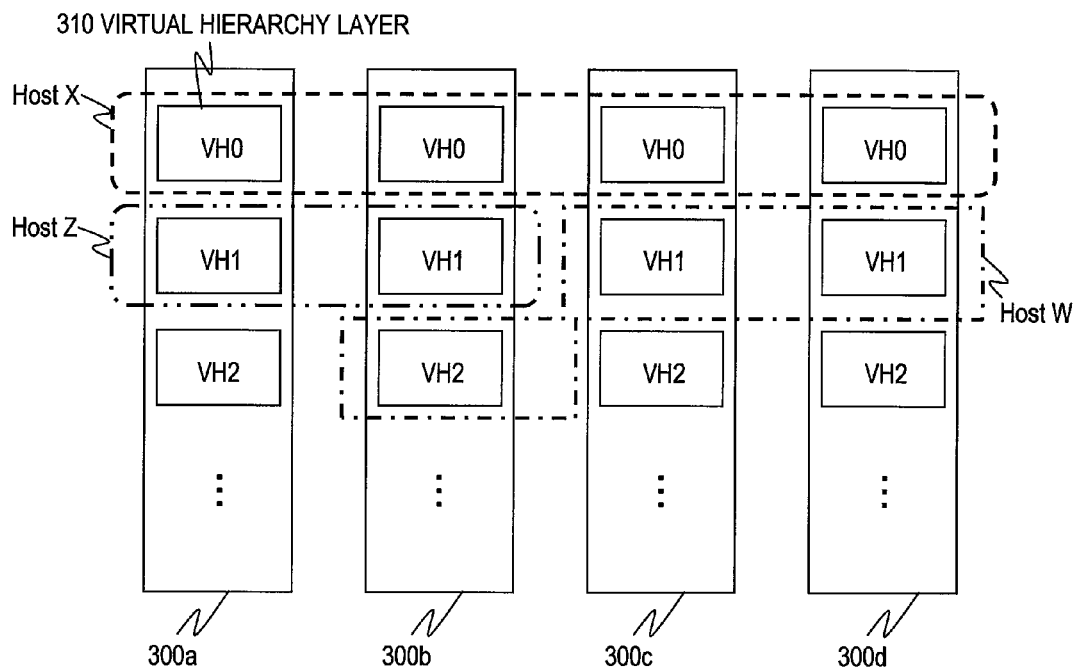
FIG. 3 is an explanatory diagram illustrating a virtual hierarchy within the MR devices according to the first embodiment of this invention.
FIG. 4 is a diagram illustrating function types according to the first embodiment of this invention.

FIG. 3 is an explanatory diagram illustrating a virtual hierarchy within the MR devices 300 according to the first embodiment of this invention, illustrating an example of virtual hierarchy layer allocation to the hosts 100.

The internal resources of each MR device 300 are divided by a unit called a virtual hierarchy layer 310. One virtual hierarchy layer 310 is distinguished from another by a virtual hierarchy number (VHN).

A single virtual hierarchy layer holds one or more functions. The virtual hierarchy layers 310 of each MR device 300 are individually connected to the virtual switches 400 shown in FIG. 6, thereby enabling the plurality of hosts 100a to 100d to access the same MR device out of the MR devices 300a to 300d concurrently.

Function types are now described.

FIG. 4 is a diagram illustrating function types according to the first embodiment of this invention.

The base function (BF) is a special function used by the PCI manager 290 and is located only on a virtual hierarchy layer that has a virtual hierarchy number "VH0". Other virtual hierarchy layers 310 than VH0 normally hold one or more physical functions (PFs) and a plurality of virtual functions (VFs).

In the example of FIG. 3, the virtual hierarchy layers VH0 of the MR devices 300a to 300d are allocated to a host X (100a), VH1 of the MR device 300a and VH1 of the MR device 300b are allocated to a host Z (100c), and VH2 of the MR device 300b, VH1 of the MR device 300c, and VH1 of the MR device 300d are allocated to a host W (100d).

Figure 6:
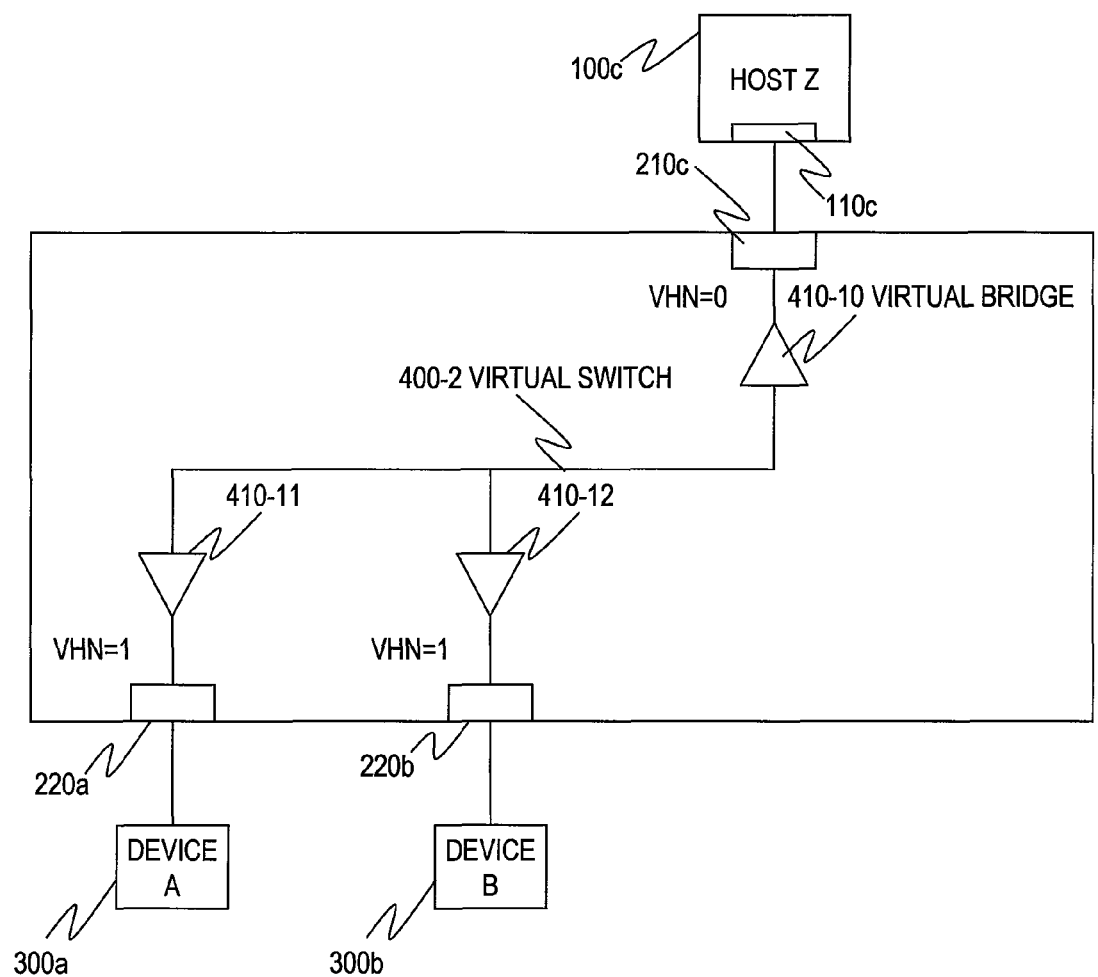
FIG. 6 is an explanatory diagram illustrating the configuration of a virtual switch that has the host Z at the top according to the first embodiment of this invention.
Figure 7:
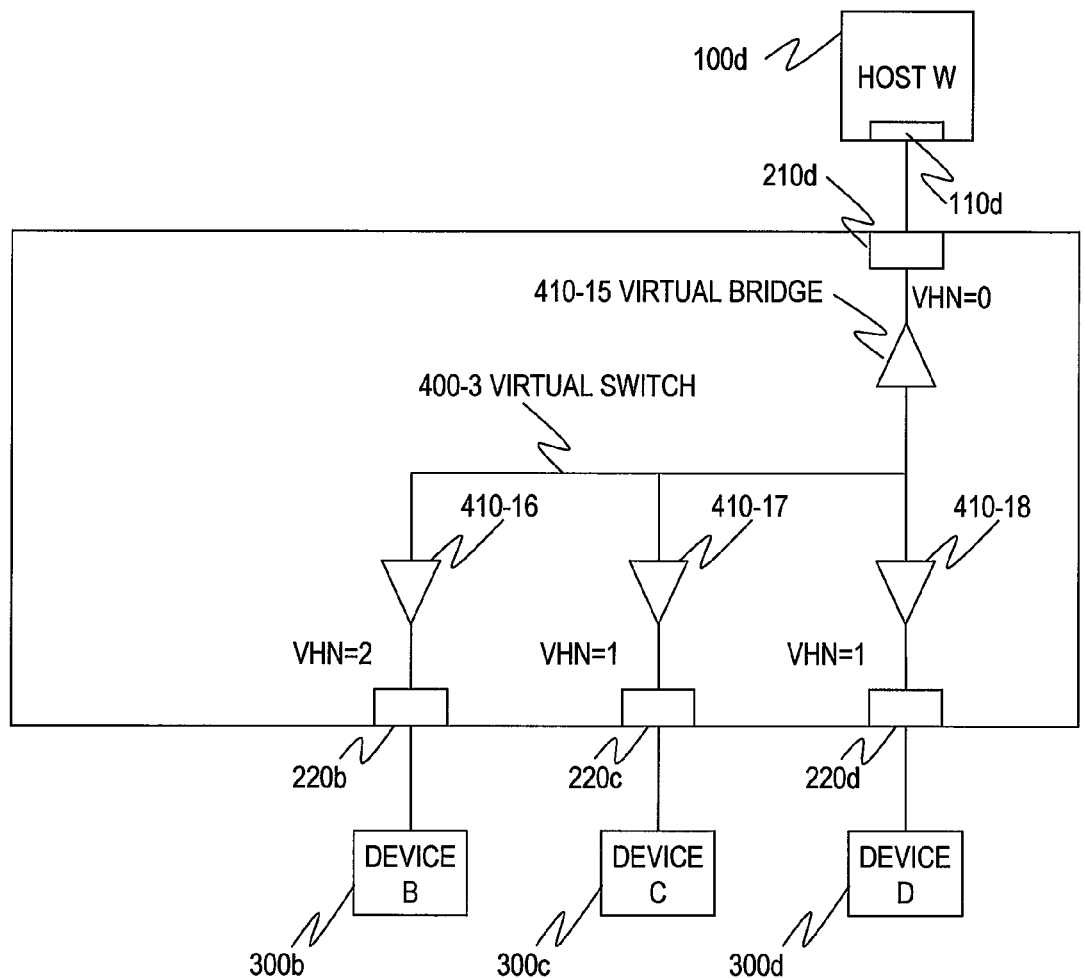
FIG. 7 is an explanatory diagram illustrating the configuration of a virtual switch that has the host W at the top according to the first embodiment of this invention.

FIGS. 5 to 7 illustrate an example of what configurations virtual switches 400 (400-0 to 400-3) and virtual bridges 410 (410-0 to 410-12 and 410-15 to 410-18) in the multi-root PCI switch 200 have when the virtual hierarchy layers are allocated as described above. The virtual bridges 410 include upstream virtual bridges and downstream virtual bridges.

Each virtual switch 400 is made up of one upstream virtual bridge 410 and zero or more downstream virtual bridges 410. The upstream virtual bridge 410 is connected to one of the upstream ports 210a to 210d. The downstream virtual bridges 410 are connected to one of the virtual hierarchy layers 310 (VHNs) at the downstream ports 220a to 220d. The downstream virtual bridges 410 do not always need to be connected to the downstream ports 220a to 220d.

FIG. 5 is an explanatory diagram illustrating the configuration of a virtual switch 400-0 that has the host X (100a) at the top according to the first embodiment of this invention.

In the example of FIG. 5, a virtual hierarchy layer of the upstream port 210a whose VHN is 0 and an upstream virtual bridge 410-0 are connected to each other. Under the upstream virtual bridge 410-0, four downstream virtual bridges 410-1 to 410-4 are connected. The downstream virtual bridges 410-1 to 410-4 are respectively connected to virtual hierarchy layers "VHN=0" of the downstream ports 220a to 220d, and connected to the virtual hierarchy layers 310 (VHN=0) of the MR devices 300a to 300d via the downstream ports 220a to 220d.

FIG. 6 is an explanatory diagram illustrating the configuration of a virtual switch 400-2 that has the host Z (100c) at the top according to the first embodiment of this invention.

In the example of FIG. 6, a virtual hierarchy layer "VHN=0" of the upstream port 210c and an upstream virtual bridge 410-10 are connected to each other. Under the upstream virtual bridge 410-10, two downstream virtual bridges 410-11 and 410-12 are connected. The downstream virtual bridge 410-11 is connected to a virtual hierarchy layer "VHN=1" of the downstream port 220a, and the downstream virtual bridge 410-12 is connected to a virtual hierarchy layer "VHN=1" of the downstream port 220b. The downstream virtual bridges 410-11 and 410-12 are connected to the virtual hierarchy layers 310 of the MR devices 300a and 300b via the downstream ports 220a and 220b.

FIG. 7 is an explanatory diagram illustrating the configuration of a virtual switch 400-3 that has the host W (100d) at the top according to the first embodiment of this invention.

In the example of FIG. 7, a virtual hierarchy layer "VHN=0" of the upstream port 210d and an upstream virtual bridge 410-15 are connected to each other. Under the upstream virtual bridge 410-15, three downstream virtual bridges 410-16 to 410-18 are connected. The downstream virtual bridge 410-16 is connected to a virtual hierarchy layer "VHN=2" of the downstream port 220b, the downstream virtual bridge 410-17 is connected to a virtual hierarchy layer "VHN=1" of the downstream port 220c, and the downstream virtual bridge 410-18 is connected to a virtual hierarchy layer "VHN=1" of the downstream port 220d. The downstream virtual bridges 410-16 to 410-18 are connected to the virtual hierarchy layers 310 of the MR devices 300b to 300d via the downstream ports 220b to 220d.

(Eliminating Single Point of Failure (SPOF), and Failover)

In the configurations of FIGS. 5 to 7, the host Z (100c) and the host W (100d) share the same MR device, 300b. However, connected to different virtual hierarchy layers 310, the host Z (100c) and the host W (100d) can use fragments of the divided resources of the MR device 300b separately from each other.

For example, in the case where a failure occurs in the host Z (100c), the influence of the failure is contained within the virtual hierarchy layer of the MR device 300b whose VHN is 1, and accordingly does not affect the host W (100d), which uses the virtual hierarchy layer "VHN=2" of the MR device 300b.

An exception to this is a failure in the virtual hierarchy layer "VHN=0" of the host X (100a). The virtual hierarchy layers "VHN=0" of the MR devices 300a to 300d hold a base function for setting the division of the MR devices 300a to 300d into virtual hierarchy layers.

Therefore, when a failure occurs in the host X (100a) or when the host X (100a) is rebooted, the virtual hierarchy layers "VHN=0" of the MR devices 300a to 300d under management of the host X (100a) are reset. Then, the base function is reset, deleting other virtual hierarchy layers (VH1≧1) and affecting the host Z (100c) and the host W (100d) as well. In short, the host X (100a) which serves as a manager host presents a single point of failure in the configurations of FIGS. 5 to 7.

Figure 8:
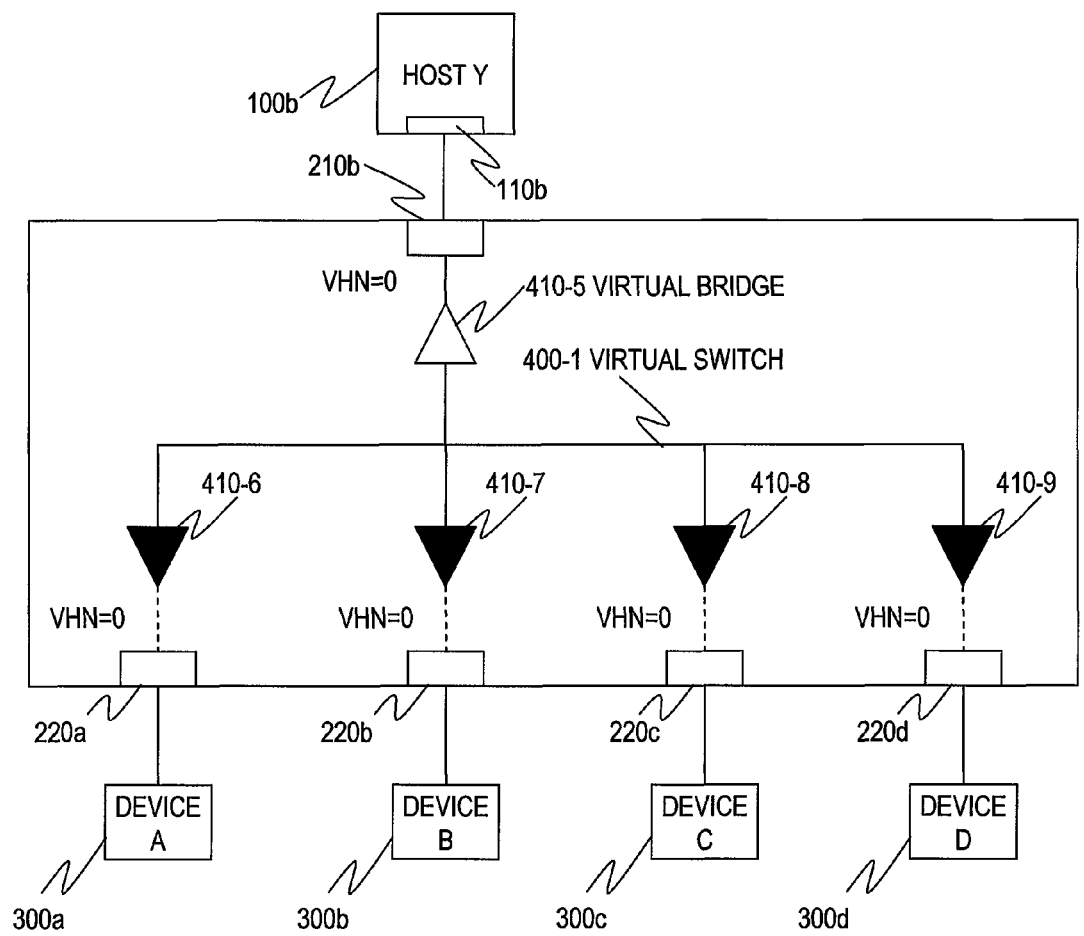
FIG. 8 is an explanatory diagram illustrating the configuration of a virtual switch that has the host Y at the top according to the first embodiment of this invention.

A possible way to avoid single point of failure is to prepare a backup host Y (100b) illustrated in FIG. 8 so that the host Y (100b) can take over from the host X (100a) (failover). The configuration of a virtual switch 400-1 that is topped by the host Y (100b) prior to the failover is illustrated in FIG. 8.

FIG. 8 is an explanatory diagram illustrating the configuration of the virtual switch 400-1 that has the host Y (100b) at the top according to the first embodiment of this invention.

In the example of FIG. 8, a virtual hierarchy layer "VHN=0" of the upstream port 210b and an upstream virtual bridge 410-5 are connected to each other. Under the upstream virtual bridge 410-5, four downstream virtual bridges 410-6 to 410-9 are connected. The downstream virtual bridges 410-6 to 410-9 are not connected to the downstream ports 220a to 220d.

In MR-IOV specifications, an arbitrary combination of a port and a virtual hierarchy layer "VHN" cannot be connected to two or more virtual bridges 410 concurrently. This is because connecting two or more virtual bridges 410 simultaneously to the same downstream port 220 creates a plurality of roots for the port, which is not acceptable in a proper PCI bus tree and does not guarantee correct operation.

This is why the downstream virtual bridges 410-6 to 410-9 and the downstream ports 220a to 220d are not connected to each other in the example of FIG. 8, where the virtual hierarchy layers "VHN=0" of the downstream ports 220a to 220d are connected to the downstream virtual bridges 410-1 to 410-4 under the virtual switch 400-0 of the host X (100a).

A description is given of the virtual switch management table 520 and the virtual bridge management table 530 that are set in the virtual switch generating logic 260 of the multi-root PCI switch 200 before this invention is applied.

In the following description, the host X (100a) is also referred to as manager host X (100a) and the host Y (100b) is also referred to as backup host Y (100b).

Figure 9:
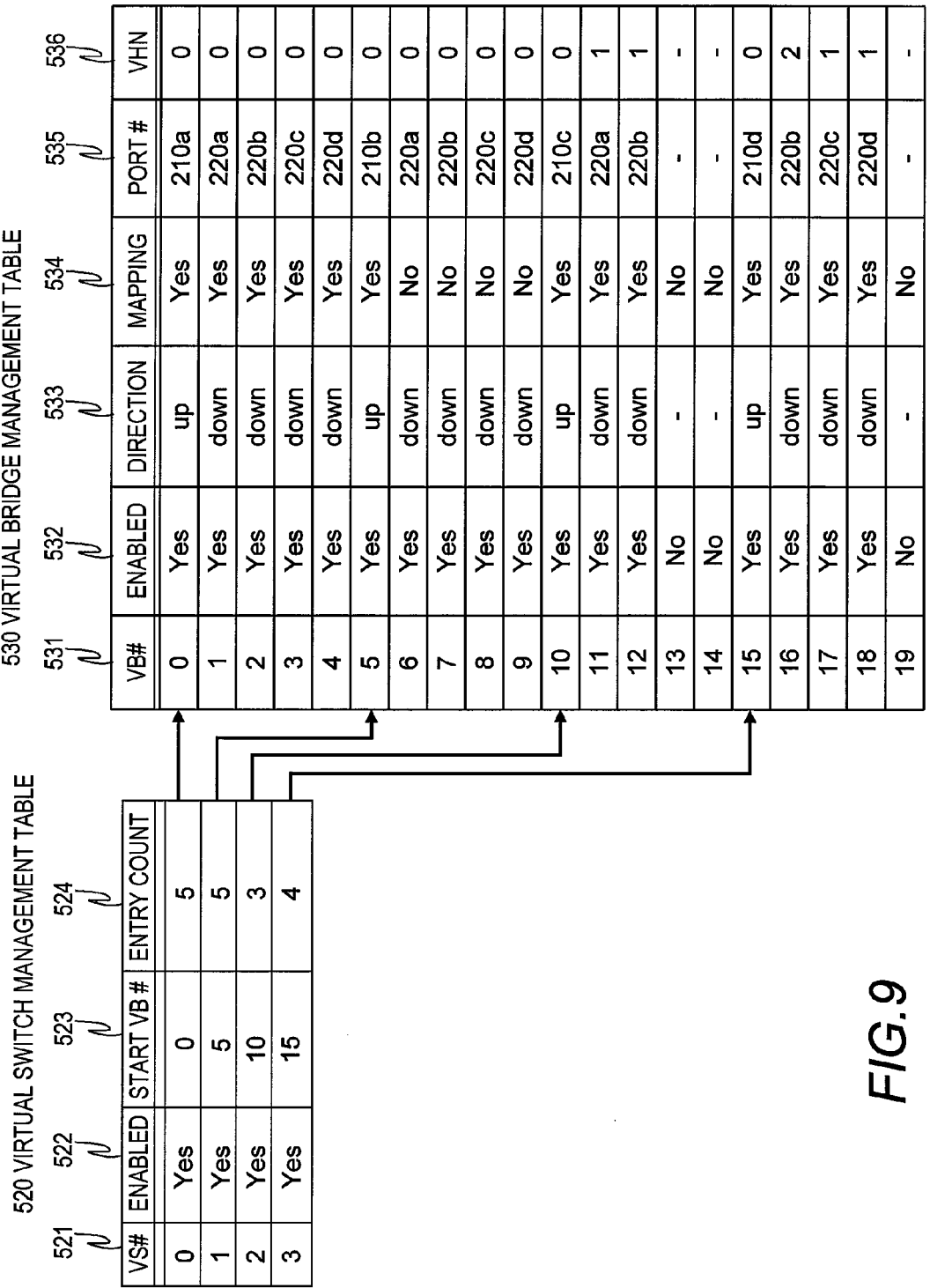
FIG. 9 is an explanatory diagram illustrating an association relation between the virtual switch management table and the virtual bridge management table according to the first embodiment of this invention.

FIG. 9 is an explanatory diagram illustrating an association relation between the virtual switch management table 520 and the virtual bridge management table 530 according to the first embodiment of this invention.

The virtual switch management table 520 and virtual bridge management table 530 of FIG. 9 are a simplified version of tables prescribed in the MR-IOV specifications but essentially the same as the tables prescribed in the MR-IOV specifications.

Each entry in the virtual switch management table 520 includes a virtual switch number (VS #) 521, an enabled flag 522, a start virtual bridge number (START VB #) 523, and a virtual bridge entry count 524. The start virtual bridge number 523 and the virtual bridge entry count 524 serve as a pointer to an entry of the virtual bridge management table 530.

Each entry in the virtual bridge management table 530 includes a virtual bridge number (VB #) 531, an enabled flag 532, a direction flag 533, which indicates upstream or downstream, a port mapping state 534, which indicates whether to map the virtual bridge in question onto a port, a port number 535 of the mapping destination port, and a virtual hierarchy number (VHN) 536 of a mapping destination virtual hierarchy layer.

The virtual switch management table 520 and virtual bridge management table 530 of FIG. 9 reflect the configurations of FIGS. 5 to 8.

Discussed below is a case in which the backup host Y (100b) takes over the virtual hierarchy layers "VHN=0" of the MR devices (300a to 300d) from the manager host X (100a) (failover/takeover from the host X (100a) to the host Y (100b)). Configuration diagrams of the virtual switches after the takeover are illustrated in FIGS. 10 and 11.

Figure 10:
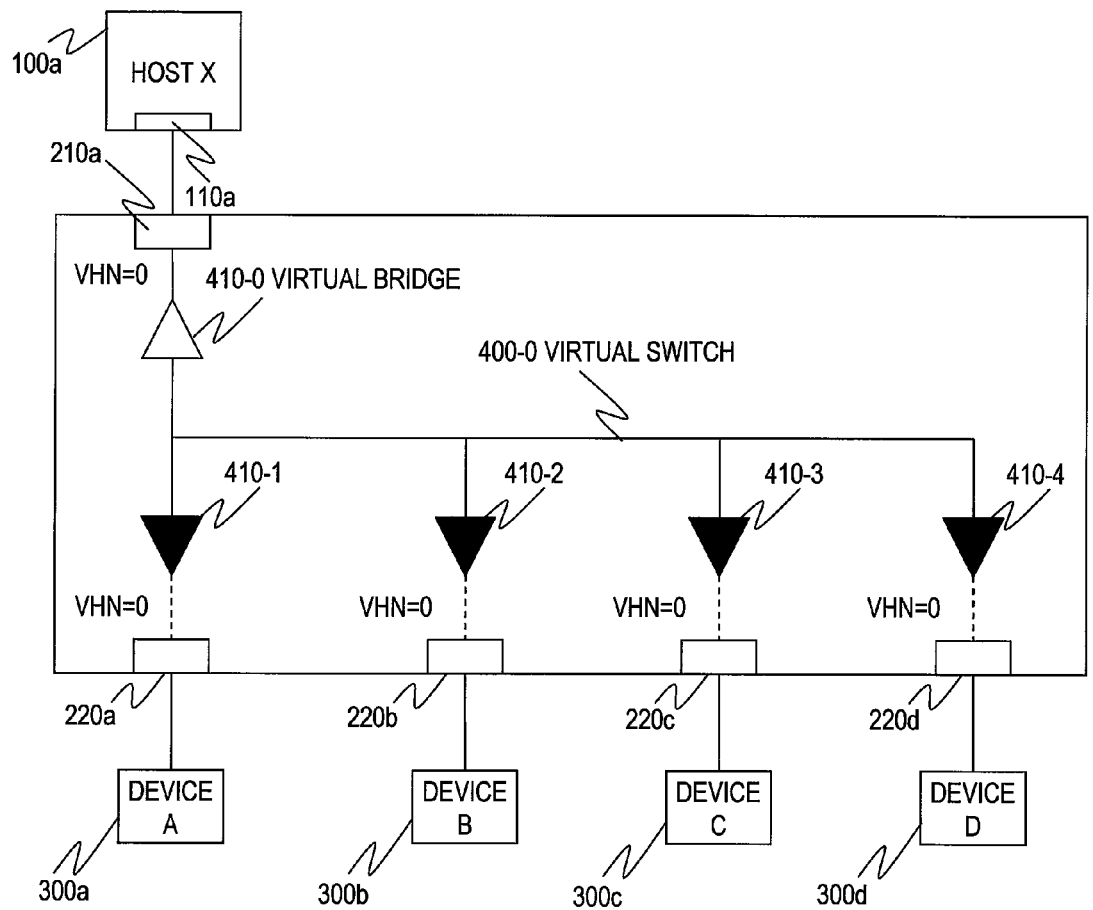
FIG. 10 is an explanatory diagram illustrating the configuration of the virtual switch that has the host X at the top after the takeover according to the first embodiment of this invention.

FIG. 10 is an explanatory diagram illustrating the configuration of the virtual switch 400-0 that has the host X (100a) at the top after the takeover according to the first embodiment of this invention. FIG. 11 is an explanatory diagram illustrating the configuration of the virtual switch 400-1 that has the host Y (100b) at the top after the takeover according to the first embodiment of this invention.

The downstream virtual bridges 410-1 to 410-4 of the virtual switch 400-0 topped by the manager host X (100a) are no longer mapped onto the downstream ports 220a to 220d and, instead, the downstream virtual bridges 410-6 to 410-9 of the virtual switch 400-1 topped by the backup host Y (100b) are now mapped onto the downstream ports 220a to 220d.

Figure 11:
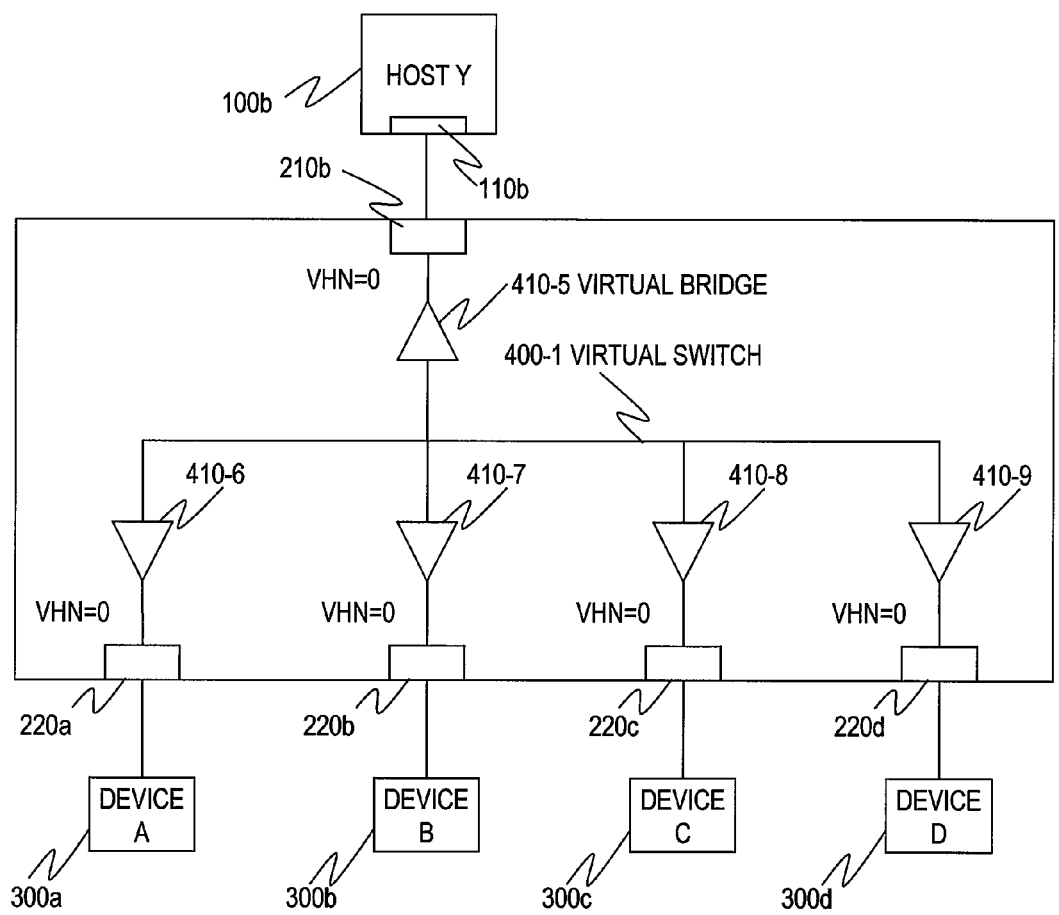
FIG. 11 is an explanatory diagram illustrating the configuration of the virtual switch that has the host Y at the top after the takeover according to the first embodiment of this invention.

In order to overwrite the virtual switch management table 520 and virtual bridge management table 530 of FIG. 9 such that the configurations of FIGS. 10 and 11 are reflected, the port mapping state 534 needs to be changed in a plurality of entries of the virtual bridge management table 530.

Specifically, in every entry that has one of "1" to "4" as the VB #531, the port mapping state 534 needs to be changed from "Yes" to "No" whereas the port mapping state 534 needs to be changed from "No" to "Yes" in every entry that has one of "6" to "9" as the VB #531.

Those changes, which cannot be executed concurrently, are executed sequentially. In executing the changes sequentially, avoiding connecting two or more virtual bridges 410 to the same port simultaneously in accordance with the MR-IOV specifications inevitably creates a temporary period in which the downstream ports 220a to 220d are not connected to any of the virtual bridges 410. In the MR-IOV specifications, the port 220 that is connected to no virtual bridge 410 is regarded as a link down and is immediately reset.

The goal of taking over from the manager host X (100a) without resetting the base function therefore cannot be achieved with the takeover method in which entries of the virtual bridge management table 530 are overwritten sequentially.

This invention achieves failover of the manager host X (100a) without resetting the base function of any relevant MR device and without deviating from the PCI/MR-IOV specifications by adding a function of switching the connection state of the virtual switches 400 concurrently to the multi-root PCI switch 200.

For that purpose, a plurality of virtual switches 400 are grouped and a pointer that points to one enabled virtual switch 400 among a group of virtual switches 400 is prepared. The mapping of other virtual switches 400 in the group than the pointed to virtual switch 400 to the downstream ports 220 is disabled.

When the pointer is changed to point to another virtual switch 400, the mapping of the virtual switch 400 that has been enabled onto one of the downstream ports 220 is disabled and, instead, the mapping of the newly pointed virtual switch 400 onto one of the downstream ports 220 is enabled.

The changes in mapping state are executed concurrently with the change of the pointer as a trigger. Creating a state that deviates from the PCI/MR-IOV specifications (state in which a virtual hierarchy layer "VHN" of one port is mapped onto two or more virtual bridges 410) is thus avoided. In addition, because every port is connected to one or another of the virtual switches 400 all the time, resetting accompanying a link down is prevented.

Details of this function are described below.

Figure 12:
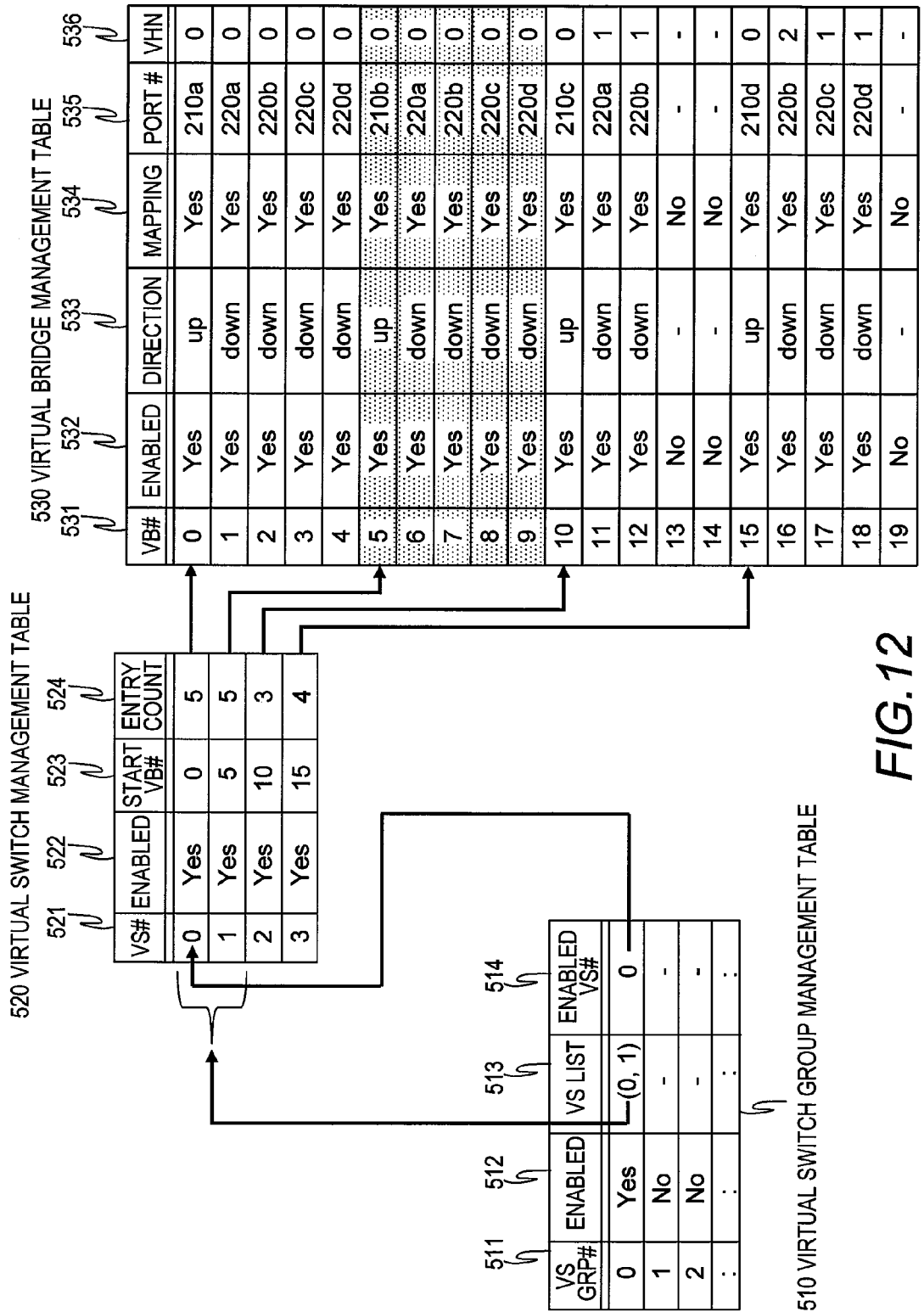
FIG. 12 is an explanatory diagram illustrating an association relation among the virtual switch management table, the virtual bridge management table, and the virtual switch group management table according to the first embodiment of this invention.

FIG. 12 is an explanatory diagram illustrating an association relation among the virtual switch management table 520, the virtual bridge management table 530, and the virtual switch group management table 510 according to the first embodiment of this invention.

FIG. 12 shows settings prior to take over from the manager host X (100a). The multi-root PCI switch 200 of this invention includes the virtual switch group management table 510 in addition to the virtual switch management table 520 and the virtual bridge management table 530 which are prescribed in the MR-IOV specifications.

Each entry in the virtual switch group management table 510 includes a virtual switch group number (VS Grp #) 511, an enabled flag 512, a virtual switch list (VS list) 513, and an enabled virtual switch number (enabled VS #) 514. The virtual switch group number 511 is an identifier for identifying a group that consists of a plurality of virtual switches 400 (virtual switch group).

In the example of FIG. 12, a virtual switch group that has "0" as the virtual switch group number 511 is enabled. The virtual switch group having "0" as the virtual switch group number 511 contains the virtual switch 400 that has "0" as the VS # (virtual switch number) 521 and the virtual switch 400 that has "1" as the VS #521. Of the two virtual switches 400, one that has "0" as the VS #521 is designated as the enabled virtual switch 400.

In accordance with the settings of the virtual switch group management table 510, the virtual switch 400 that has "0" as the VS #521 is enabled in the virtual switch management table 520 and, in the virtual bridge management table 530, every virtual bridge 410 that has one of "0" to "4" as the VB #531 is enabled and mapped onto one of the downstream ports 220.

On the other hand, the virtual switch 400 belonging to the same virtual switch group that has "1" as the VS #521 is disabled and the mapping of the downstream virtual bridges 410 of this virtual switch 400 onto the downstream ports 220 is accordingly disabled in the virtual switch group management table 510. A state in which two or more virtual bridges 410 are connected to one downstream port 220 can thus be avoided.

In the example of FIG. 12, the port mapping state 534 is "Yes" for both the virtual switch 400 that has "0" as the VS #521 and the virtual switch 400 that has "1" as the VS #521, which means that those virtual switches 400 are connectable virtual switches. Connecting the virtual bridges 410 and the downstream ports (220a to 220d) is actually implemented by the routing control module 250.

Specifically, based on the port mapping information 263 and the virtual switch configuration information 264 which are input from the virtual switch generating logic 260, the routing control module 250 enables the connection (mapping) between the virtual bridge 410 that has "0" as the VB #531 and one of the downstream ports (220a to 220d), and disables the connection (mapping) between the virtual bridge 410 of the virtual switch 400 that has "1" as the VS #521 and one of the downstream ports (220a to 220d).

Figure 13:
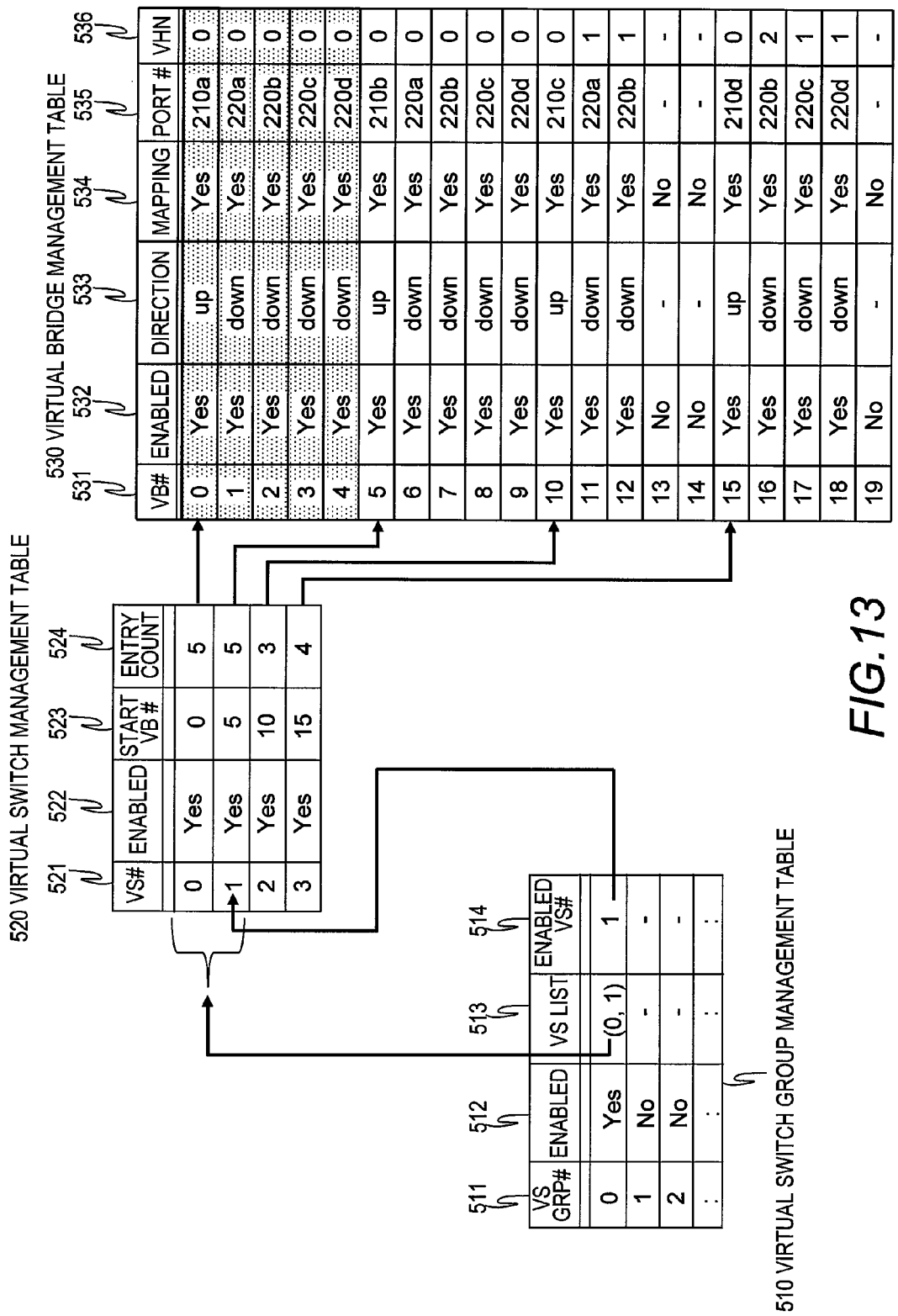
FIG. 13 is an explanatory diagram illustrating an association relation among the virtual switch management table, the virtual bridge management table, and the virtual switch group management table according to the first embodiment of this invention.

FIG. 13 is an explanatory diagram illustrating an association relation among the virtual switch management table 520, the virtual bridge management table 530, and the virtual switch group management table 510 according to the first embodiment of this invention. FIG. 13 shows a state after the backup host Y (100b) takes over from the manager host X (100a).

FIG. 13 differs from FIG. 12 in that the enabled virtual switch number 514 is changed from "0" to "1" in an entry of the virtual switch group management table 510 that has "0" as the virtual switch group number 511.

Through this change, the mapping of the downstream virtual bridges 410 onto the downstream ports 220 is disabled in the virtual switch 400 having "0" as the VS #521 which has been enabled, whereas the mapping of the downstream virtual bridges 410 onto the downstream ports 220 is enabled in the virtual switch 400 belonging to the same virtual switch group that has "1" as the VS #521.

This switching takes place concurrently at all ports under the virtual switches 400 that are switched. Therefore, duplicated connection in which more than one virtual bridge 410 is connected to a single port 220 can be avoided, as well as a state in which the virtual bridges 410 are disconnected from the ports 220. Takeover from the manager host X (100a) to the backup host Y (100b) can thus be executed without allowing the base function of any relevant MR device to be reset.

(Configuration of the Virtual Switch Generating Logic)

Figure 14:
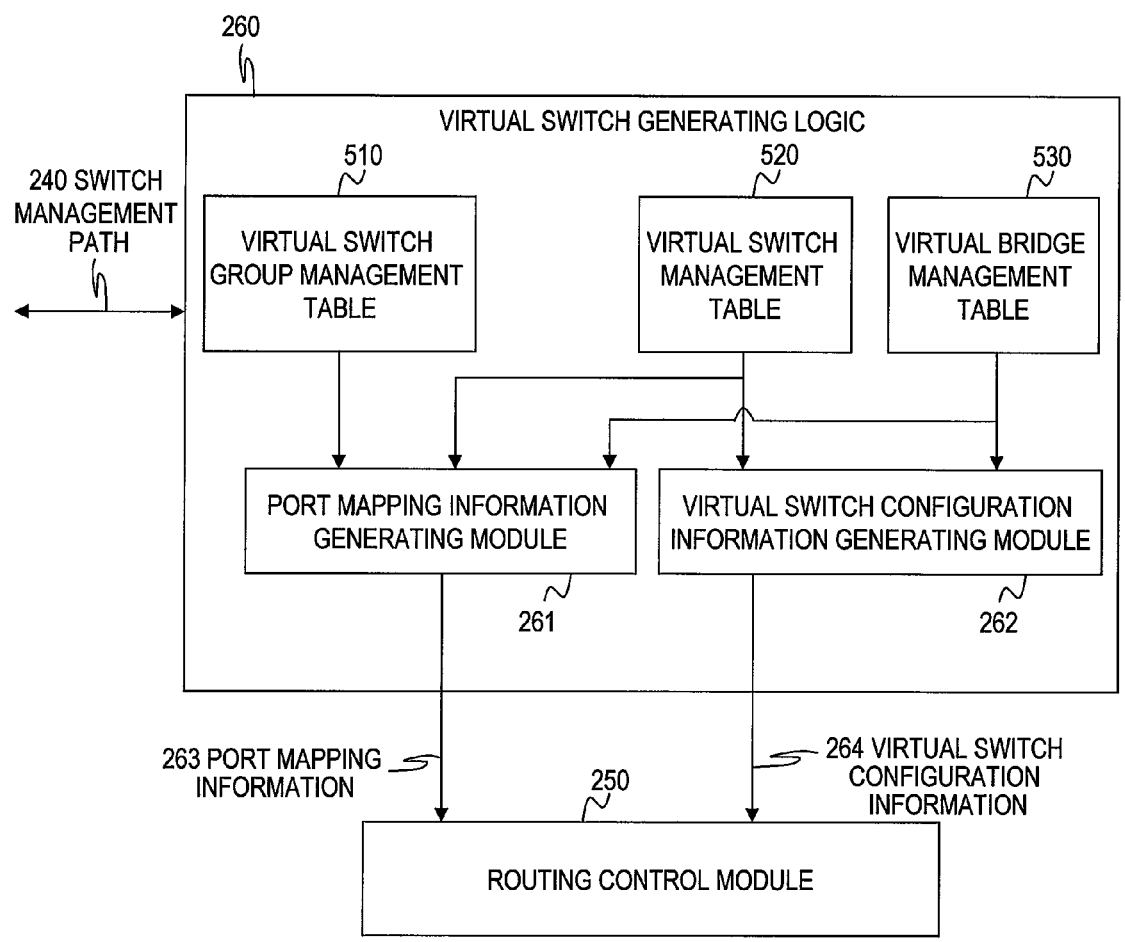
FIG. 14 is a block diagram illustrating the configuration of the virtual switch generating logic that is included in the multi-root PCI switch according to the first embodiment of this invention.

FIG. 14 is a block diagram illustrating the configuration of the virtual switch generating logic 260 that is included in the multi-root PCI switch 200 according to the first embodiment of this invention.

The virtual switch generating logic 260 includes the virtual switch group management table 510, the virtual switch management table 520, the virtual bridge management table 530, a port mapping information generating module 261, and a virtual switch configuration information generating module 262.

The port mapping information generating module 261 generates the port mapping information 263 based on information that is input from the virtual switch group management table 510 and from the virtual switch management table 520, and outputs the generated port mapping information 263 to the routing control module 250.

The virtual switch configuration information generating module 262 generates the virtual switch configuration information 264 based on information that is input from the virtual switch management table 520 and from the virtual bridge management table 530, and outputs the generated virtual switch configuration information 264 to the routing control module 250.

The PCI manager 290 sets the virtual switch group management table 510, the virtual switch management table 520, and the virtual bridge management table 530 separately via the switch management paths 240.

The set information is output to the routing control module 250 through the port mapping information generating module 261 and the virtual switch configuration information generating module 262 as the port mapping information 263 and the virtual switch configuration information 264. The routing control module 250 uses the input port mapping information 263 and virtual switch configuration information 264 to grasp the connection relation between ports, and to route packets that travel along the internal buses 230.

A change from FIG. 12 to FIG. 13 is accomplished by the port mapping information generating module 261. Processing executed by the port mapping information generating module 261 is described below.

Figure 15:
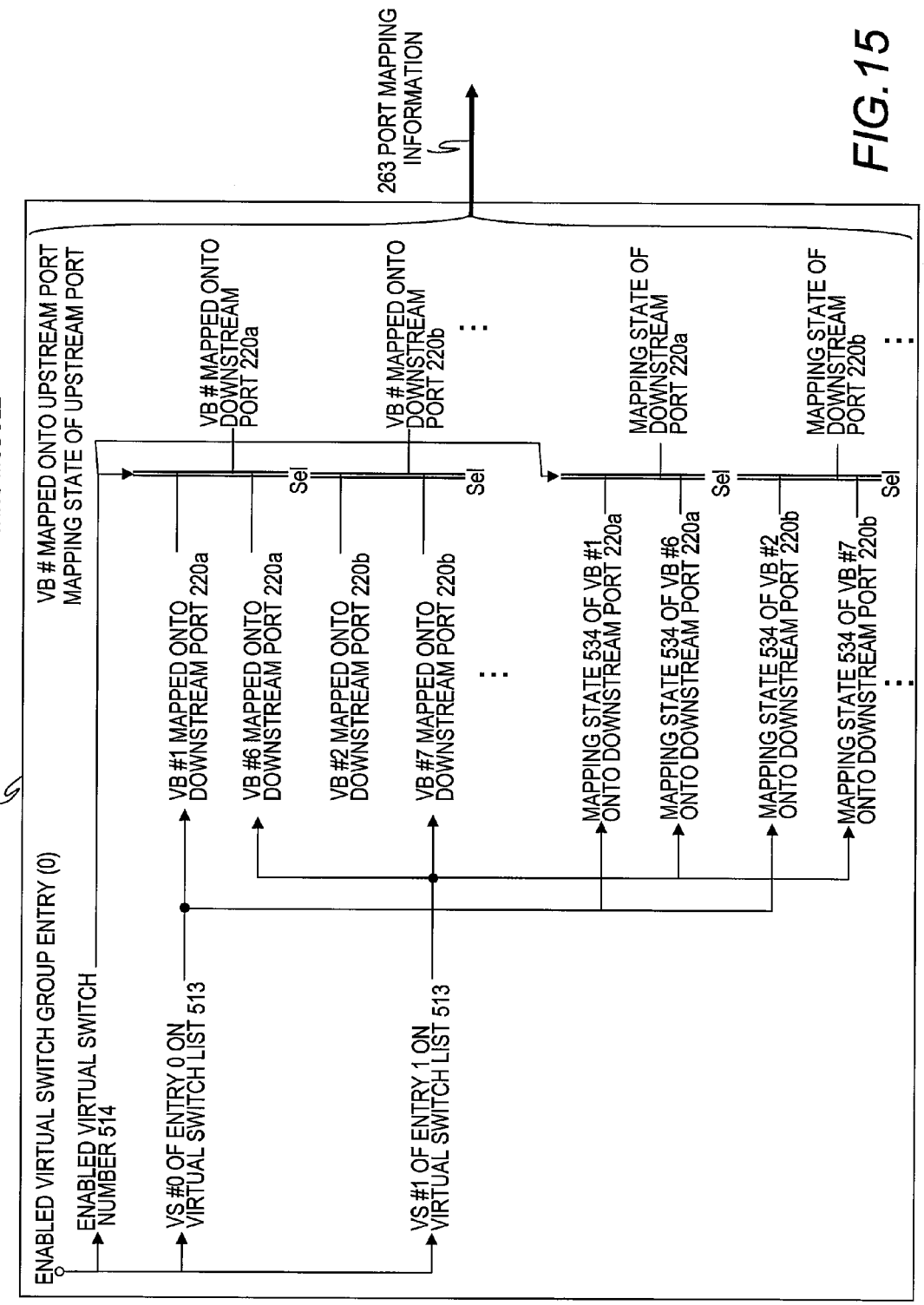
FIG. 15 is an explanatory diagram illustrating an example of processing that the port mapping information generating module executes according to the first embodiment of this invention.

FIG. 15 is an explanatory diagram illustrating an example of processing that the port mapping information generating module 261 executes according to the first embodiment of this invention.

The port mapping information generating module 261 refers to the virtual switch group management table 510 and the virtual switch management table 520 to extract, from an entry of a virtual switch group that is enabled, virtual switch numbers listed on the virtual switch list 513.

For each of the extracted virtual switch numbers, the port mapping information generating module 261 identifies a virtual switch that is assigned the virtual switch number, and chooses the VB numbers 531 of the virtual bridges 410 of this virtual switch that are mapped onto an arbitrary downstream port 220 (here, the arbitrary downstream port is 220a and the virtual bridges that have "1" and "6" as their respective VB numbers 531 are chosen).

Of the chosen virtual bridges 410, the port mapping information generating module 261 enables only the mapping of the virtual bridge 410 belonging to a virtual switch that is indicated by the enabled virtual switch number 514, and disables the mapping of all other chosen virtual bridges 410.

The port mapping information generating module 261 executes the processing of FIG. 15 for all the downstream ports 220 (here, 220a to 220d).

The port mapping information generating module 261 outputs port mapping information of the downstream ports 220 chosen through the processing of FIG. 15, together with port mapping information of the upstream ports 210, as the port mapping information 263.

Figure 28:
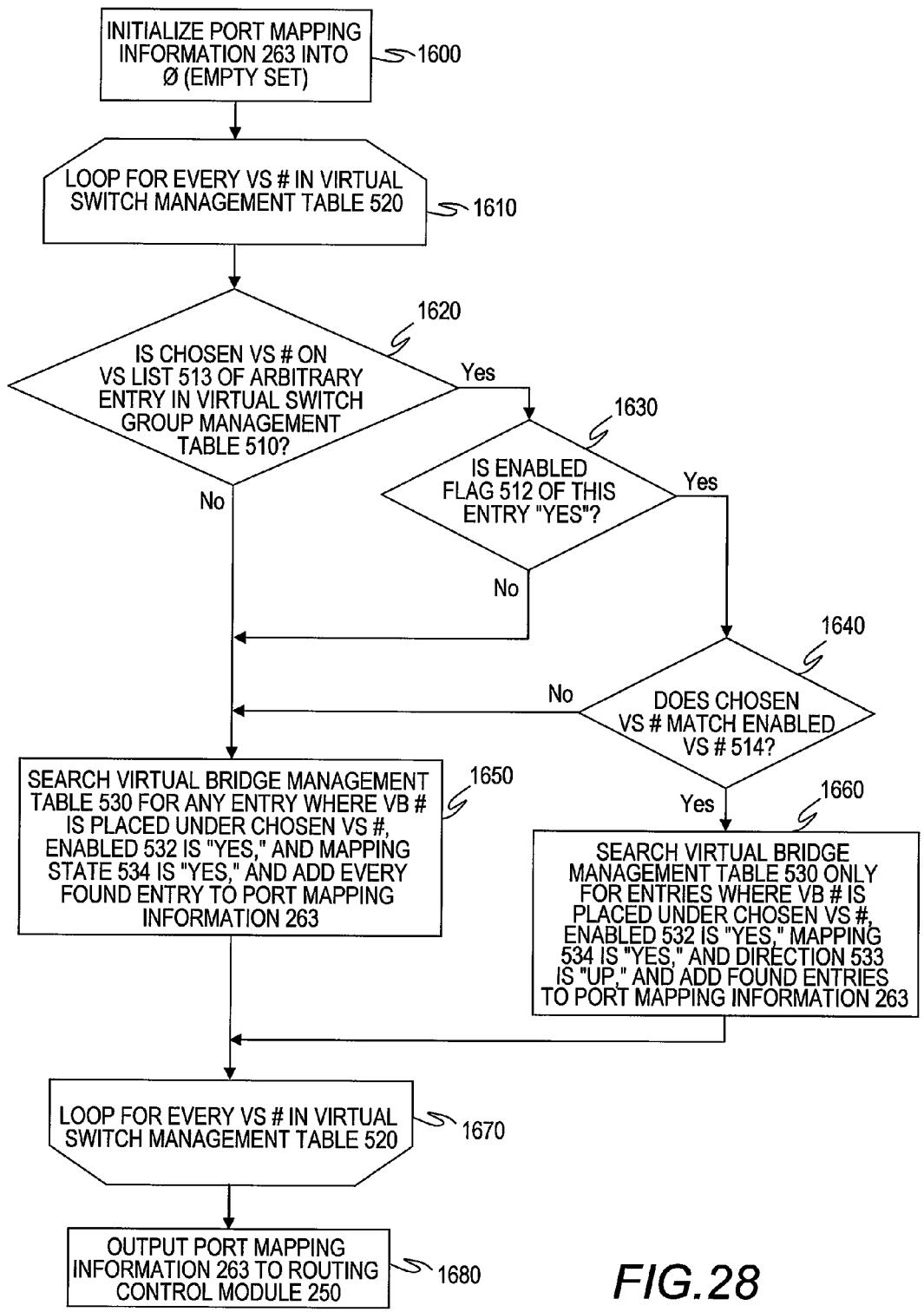
FIG. 28 is a flowchart illustrating processing that the port mapping information generating module executes according to the first embodiment of this invention.

FIG. 28 is a flowchart illustrating processing that the port mapping information generating module 261 executes according to the first embodiment of this invention. FIG. 28 is a representation of the processing of FIG. 15 in the form of flowchart.

The port mapping information generating module 261 initializes the port mapping information 263 (Step 1600).

The port mapping information generating module 261 refers to the virtual switch management table 520 to execute processing for every virtual switch number 521 (Step 1610). Specifically, the port mapping information generating module 261 processes each virtual switch number 521 separately.

The port mapping information generating module 261 determines whether or not the chosen virtual switch number 521 is found on the virtual switch list 513 in an arbitrary entry of the virtual switch group management table 510 (Step 1620).

Determining that the chosen virtual switch number 521 is not on the virtual switch list 513 in an arbitrary entry of the virtual switch group management table 510, the port mapping information generating module 261 proceeds to Step 1650.

Determining that the chosen virtual switch number 521 is on the virtual switch list 513 in an arbitrary entry of the virtual switch group management table 510, the port mapping information generating module 261 determines whether or not the enabled flag 512 of the entry is "Yes" (Step 1630).

Determining that the enabled flag 512 of the entry is not "Yes", the port mapping information generating module 261 proceeds to Step 1650.

Determining that the enabled flag 512 of the entry is "Yes", the port mapping information generating module 261 determines whether or not the chosen virtual switch number 521 matches the enabled virtual switch number 514 (Step 1640).

Determining that the chosen virtual switch number 521 does not match the enabled virtual switch number 514, the port mapping information generating module 261 refers to the virtual bridge management table 530 to extract any entry for the virtual bridge 410 under the virtual switch 400 that is identified by the chosen virtual switch number 521 where the enabled flag 532 is "Yes" and the port mapping state 534 is "Yes", and adds every extracted entry to the port mapping information 263 (Step 1650).

Determining that the chosen virtual switch number 521 matches the enabled virtual switch number 514, the port mapping information generating module 261 refers to the virtual bridge management table 530 to extract only an entry for the virtual bridge 410 under the virtual switch 400 that is identified by the chosen virtual switch number 521 where the enabled flag 532 is "Yes", the port mapping state 534 is "Yes", and the direction flag 533 is "up", and adds the extracted entry to the port mapping information 263 (Step 1660).

Through Step 1660, the mapping of the virtual bridge 410 onto the upstream port 210 is enabled whereas the mapping of the virtual bridges 410 onto the downstream ports 220 is disabled.

The port mapping information generating module 261 executes loop processing (Step 1620 to Step 1660) until every virtual switch number 521 in the virtual switch management table 520 is processed (Step 1670).

The port mapping information generating module 261 outputs results of Step 1620 to Step 1660 to the routing control module 250 as the port mapping information 263 (Step 1680), and then ends the processing.

(Failover Processing within the PCI Manager)

Next, failover processing within the PCI manager 290 is described.

Figure 16:
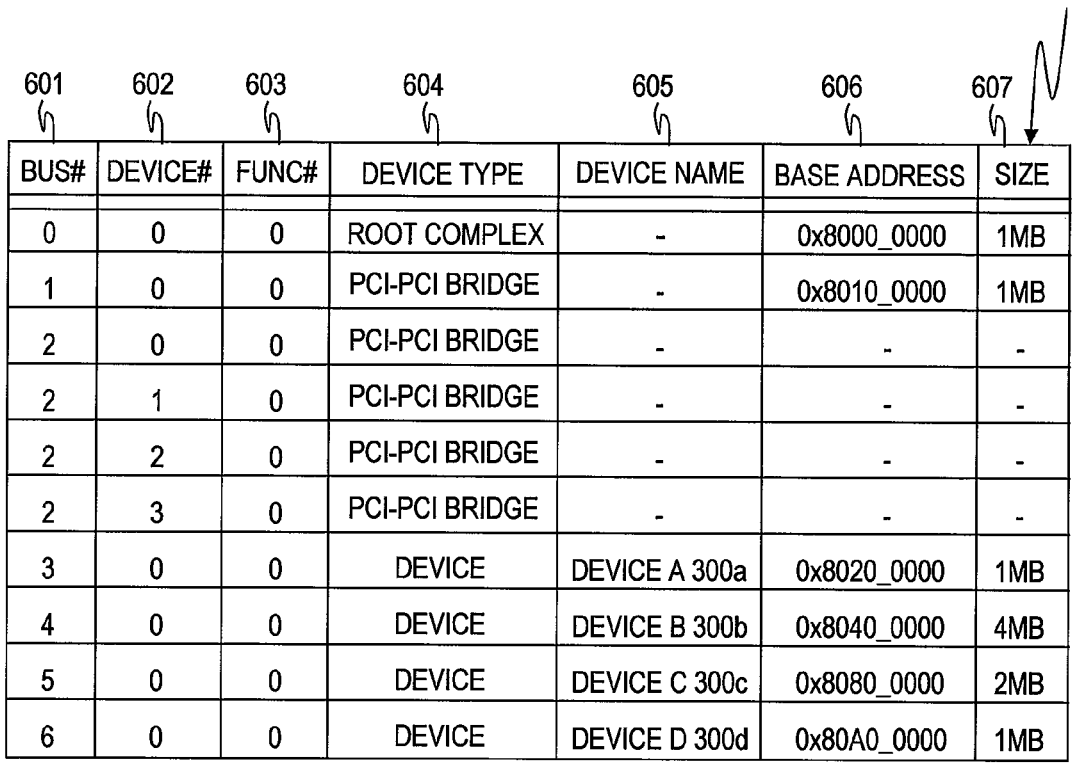
FIGS. 16 and 17 are explanatory diagrams illustrating the PCI bus tree management table according to the first embodiment of this invention.

FIG. 16 is an explanatory diagram illustrating the PCI bus tree management table 136 according to the first embodiment of this invention. FIG. 16 shows a PCI bus tree management table 136-*x*, which is held in the PCI manager 290 on the host X (100*a*) prior to take over (failover).

Devices and bridges along PCI buses are each uniquely identified by an identifier that is a combination of a bus #601, a device #602, and a func. (FUNC) #603, and managed by the identifier.

As a device type 604, information indicating whether a device in question is a root complex, a bridge, or one of the MR devices 300 is stored. A device name is stored as a device name 605 in the case where the device type 604 is the MR device 300.

When the device in question is accessible through memory-mapped I/O, a base address 606 and a size 607 are stored as well.

In the example of FIG. 16, a device that has "0" as the bus #601 corresponds to a root complex (in this case, corresponds to the I/O hub 140). A device that has "1" as the bus #601 corresponds to the upstream virtual bridge 410-0. Devices that have "2" as the bus #601 and "0" to "3" as the device #602 correspond to the downstream virtual bridges 410-1 to 410-4, respectively. A device that has "3" as the bus #601, a device that has "4" as the bus #601, a device that has "5" as the bus #601, and a device that has "6" as the bus #601 correspond to an MR device A (300*a*), an MR device B (300*b*), an MR device C (300*c*), and an MR device D (300*d*), respectively.

Figure 17:
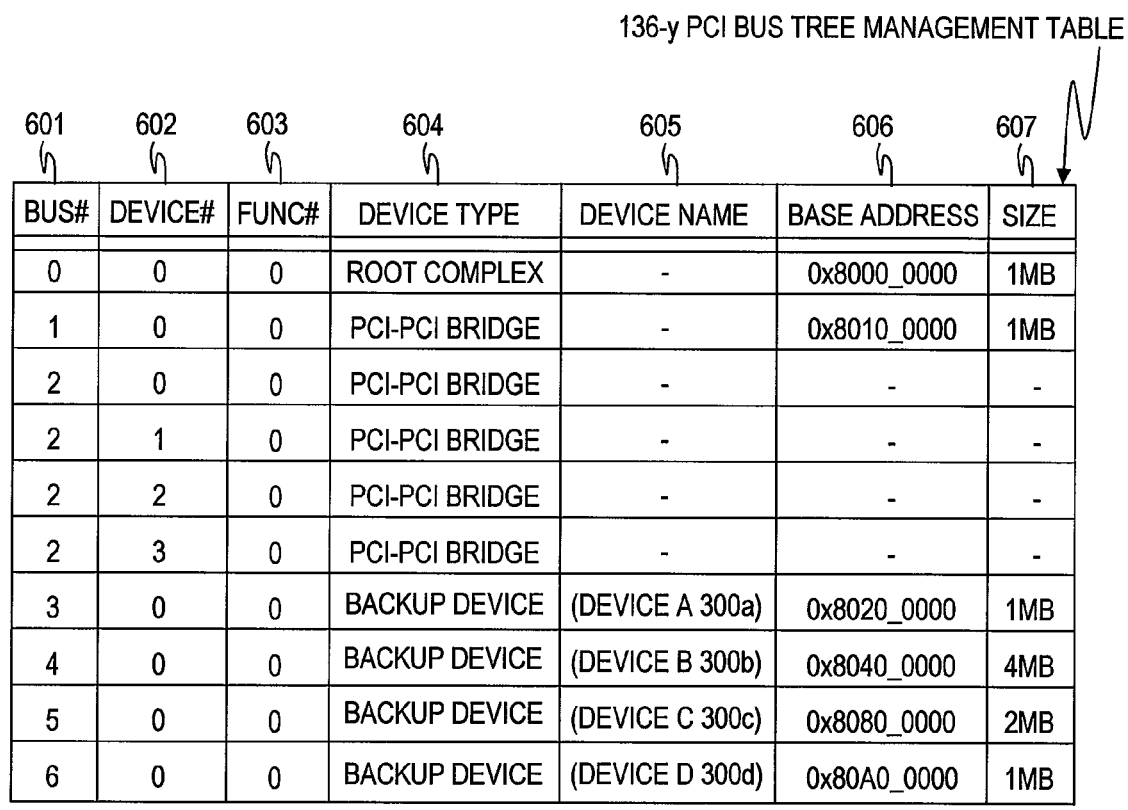

FIG. 17 is an explanatory diagram illustrating the PCI bus tree management table 136 according to the first embodiment of this invention. FIG. 17 shows a PCI bus tree management table 136-*y*, which is held in the PCI manager 290 on the host Y (100*b*) prior to take hover (failover).

In the virtual switch 400-1 which is used by the host Y (100*b*), the tree leads to the virtual bridges 410 but does not reach the MR devices 300 because those virtual bridges 410 are not connected to the downstream ports 220 at the time. Accordingly, if the procedures of usual PCI bus enumeration are followed, a PCI bus tree that contains no device is created.

The host Y (100*b*) avoids this by communicating with the active host X (100*a*) over the management network 270, or via a register inside the multi-root PCI switch 200, to prepare for takeover (failover).

The host Y (100*b*) makes preparation by creating the PCI bus tree management table 136-*y* based on the PCI bus tree management table 136-*x* of the host X (100*a*).

Specifically, the host Y (100*b*) prepares backup device entries for devices that the host Y is to take over (in this example, the device A (300*a*) to the device D (300*d*)) in entries of the PCI bus tree management table 136-*y* that correspond to entries of the PCI bus tree management table 136-*x* where a value "device" is stored as the device type 604 (in this example, entries having "3" to "6" as the bus #601). In the backup device entries, the bus #601, device #602, func. #603, base address 606, and size 607 of the devices that the host Y (100*b*) is to take over are reserved.

In this manner, the host Y (100*b*) can take over the MR devices 300 that are under the host X (100*a*) without needing to re-enumerate PCI buses or to re-assign memory-mapped I/O addresses.

(Procedures of Planned Failover)

FIGS. 18 and 19 are explanatory diagrams illustrating a user-operated interface for manipulating the host-device allocation table 650 by calling up the PCI manager 290 through the management console 280 according to the first embodiment of this invention.

Each entry in the host-device allocation table 650 includes a manager host specifying field (manager host) 651, a host name (host) 652, a device specifying field (device) 653, and a virtual hierarchy number specifying field (VHN) 654.

The manager host specifying field 651 holds information indicating whether the manager host X (100*a*) is an active host or a backup host. As the host name 652, a host name (or a host number) is stored. The device specifying field 653 holds the MR devices 300 to which the manager host X (100*a*) is connected. The virtual hierarchy number specifying field 654 holds virtual hierarchy layer numbers of the MR devices 300.

The user-operated interface for manipulating the host-device allocation table 650 may, if necessary, be a graphical user interface that displays the state of the virtual switches 400 as those illustrated in FIGS. 5 to 8, instead of the text-based screen of FIG. 18.

The PCI manager 290 creates the virtual switch group management table 510, the virtual switch management table 520, and the virtual bridge management table 530 based on the host-device allocation table 650 and the topology information 660, which shows for each of the ports 210 and ports 220 of the multi-root PCI switch 200 what is connected to the port. The PCI manager 290 manages the virtual switches 400 based on the created management tables.

Specifically, the PCI manager 290 inputs the created management tables to the virtual switch generating logic 260 within the multi-root PCI switch 200 to execute the generation and management of the virtual switches 400.

The topology information 660 is now described.

Figure 27:
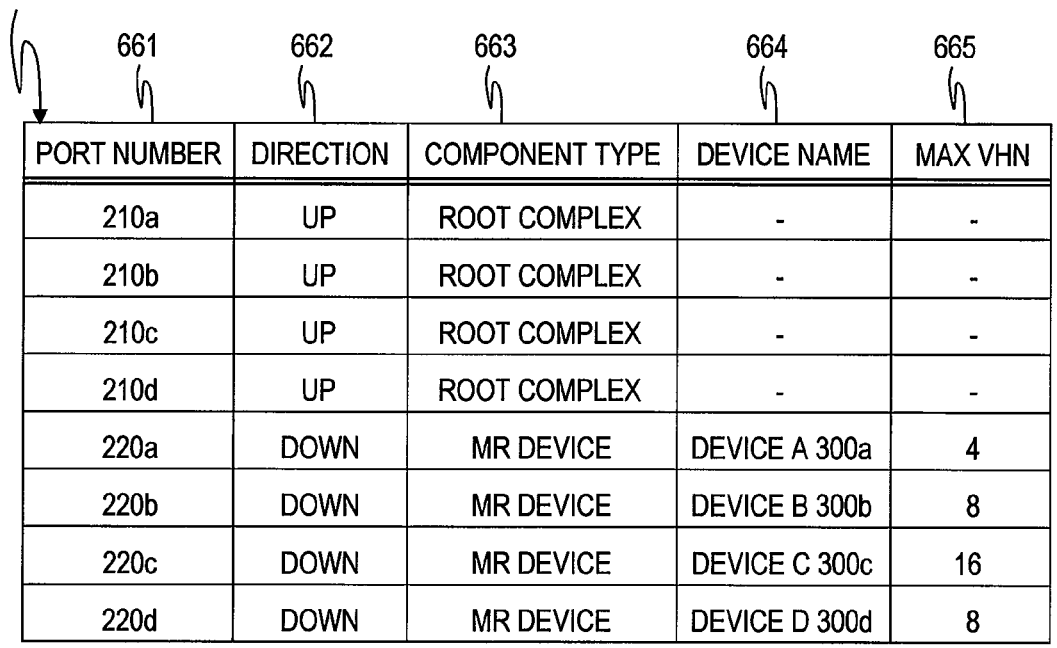
FIG. 27 is an explanatory diagram illustrating an example of the topology information according to the first embodiment of this invention.

FIG. 27 is an explanatory diagram illustrating an example of the topology information 660 according to the first embodiment of this invention.

The topology information 660 includes a port number 661, a direction 662, a component type 663, a device name 664, and a maximum virtual hierarchy layer count (MAX VHN) 665.

As the port number 661, an identifier for identifying each of the ports 210 and the ports 220 in the multi-root PCI switch 200 is stored. As the direction 662, there is stored information that indicates whether a port identified by the port number 661 is one of the upstream ports 210 or one of the downstream ports 220.

As the component type 663, there is stored a type of a device that is connected to the port identified by the port number 661. As the device name 664, there is stored an identifier by which one of the MR devices 300 is identified when the component type 663 is "MR device". As the maximum virtual hierarchy layer count 665, there is stored a count of virtual hierarchy layers that can be created in the MR device 300.

A description is given below of procedures that an administrator follows via the screen of the management console 280 to switch the manager host from the host X (100a) to the host Y (100b) in accordance with a plan.

The administrator manipulates the host-device allocation table 650 such that an attribute in the manager host specifying field 651 for the host Y (100b) is switched from "backup" to "active" as shown in FIG. 19. Because the host Y (100b) and the host X (100a) belong to the same virtual switch group, an attribute in the manager host specifying field 651 for the host X (100a) is switched from "active" to "backup" in conjunction with this switching manipulation by the administrator. After that, a prompt for confirming the switching is displayed on the screen of the management console 280 and, upon approval by the administrator, planned takeover is started.

Figure 20:
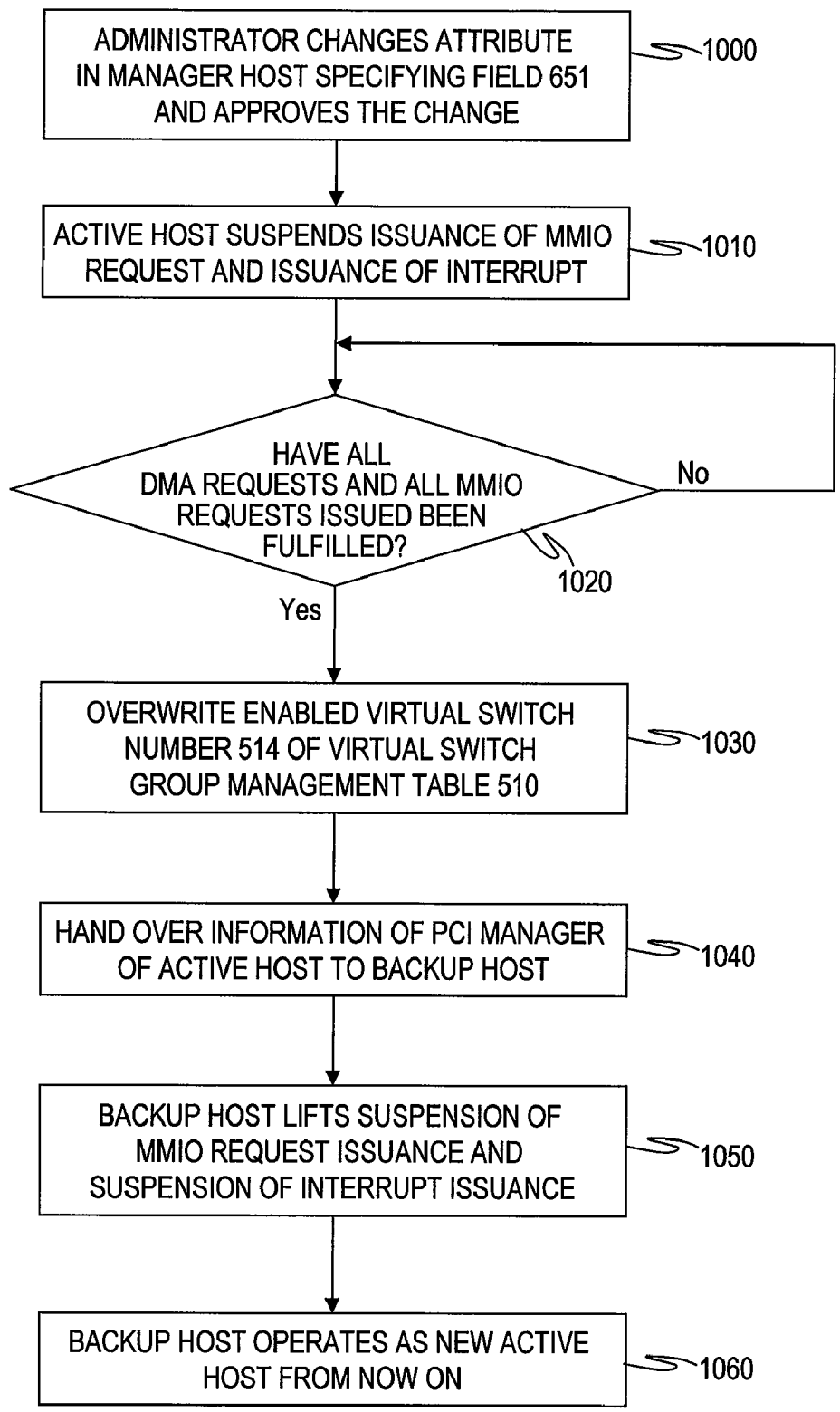
FIG. 20 is a flowchart illustrating processing of planned takeover according to the first embodiment of this invention.

FIG. 20 is a flowchart illustrating processing of planned takeover according to the first embodiment of this invention.

Upon reception of a request to start planned takeover from the administrator (Step 1000), the active host X (100a) suspends MMIO access to devices under its management and also stops issuing an interrupt to the PCI manager 290 (Step 1010). An interrupt to the PCI manager 290 is made with the use of, for example, message signaled interrupt (MSI) or INTx #.

The active host X (100a) waits until all MMIO requests and DMA requests that have been issued are fulfilled (Step 1020). After the MMIO requests and DMA requests that have been issued are all fulfilled, it is guaranteed that the virtual switches 400 of the active host X (100a) do not contain any in-flight transactions (Tx's).

The active host X (100a) then overwrites the enabled virtual switch number 514 of the virtual switch group management table 510 (Step 1030).

In this embodiment, the enabled virtual switch number 514 is changed from "0" to "1".

The active host X (100a) hands information over to the backup host Y (100b) (Step 1040). With the handing over of information, actual devices shown in the PCI bus tree management table 136-x of FIG. 16 replace values in the "backup device" entries of the PCI bus tree management table 136-y of the backup host Y (100b).

The backup host Y (100b) lifts the suspension of an interrupt to the PCI manager 290 and the suspension of MMIO request issuance (Step 1050).

From then on, the backup host Y (100b) manages the devices, including the PCI manager 290, as an active host Y (100b) (Step 1060).

The first embodiment of this invention has now been described.

Modification Example of the First Embodiment (Takeover upon Failure (=Failover))

A modification example of the first embodiment of this invention is described next.

A difference between this modification example and the first embodiment is when to execute failover to the backup host Y (100b). Specifically, in the modification example of the first embodiment, the backup host Y (100b) detects a failure in the active host X (100a) and the detection of the failure triggers the execution of failover.

A computer system in the modification example and its components including the hosts 100 and the multi-root PCI switch 200 have the same configurations as those in the unmodified first embodiment. Descriptions on the components are therefore omitted here, and the focus is placed on differences from the unmodified first embodiment in the following description.

Figure 21:
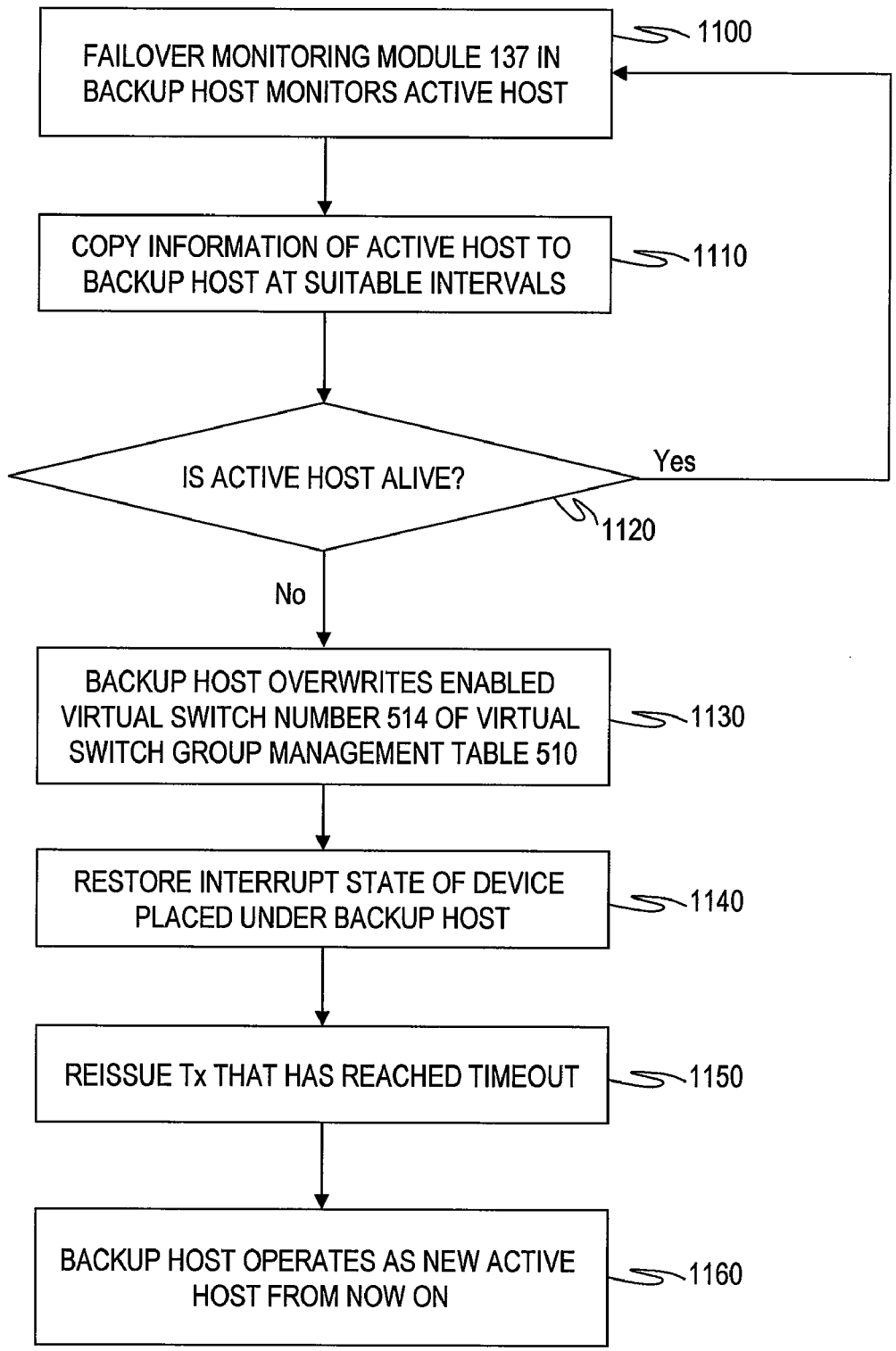
FIG. 21 is a flowchart illustrating processing of takeover upon failure according to the modification example of the first embodiment of this invention.

FIG. 21 is a flowchart illustrating processing of takeover upon failure according to the modification example of the first embodiment of this invention.

The active host X (100a) and the backup host Y (100b) monitor each other through their failover monitoring modules 137 with the use of heartbeat or the like (Step 1100). A network for heartbeat may be prepared separately from the management network 270.

While monitoring the active host X (100a), the backup host Y (100b) copies information of the active host X (100a) at suitable intervals to synchronize with the active host X (100a) (Step 1110). The backup host Y (100b) needs to copy information of the active host X (100a) only once in the case where there are no changes in the state of the MR devices 300 and other components. The backup host Y (100b) may also copy information of the active host X (100a) after a change is detected in the state of the MR devices 300 or other components.

The backup host Y (100b) uses the failover monitoring module 137 to determine whether or not a failure has occurred in the active host X (100a) (Step 1120). The backup host Y (100b) repeats Step 1100 to Step 1120 until a failure in the active host X (100a) is detected.

Detecting a failure in the active host X (100a), the backup host Y (100b) overwrites the enabled virtual switch number 514 in the virtual switch group management table 510 with one of the virtual switches 400 to which the backup host Y (100*b*) belongs (Step 1130). In this example, the enabled virtual switch number 514 is changed from "0" to "1".

This processing allows the backup host Y (100*b*) to take over from the active host X (100*a*). However, because there may be an in-flight Tx unlike the planned takeover, the backup host Y (100*b*) executes processing of restoring the Tx.

There is also a possibility that an interrupt is lost, and the backup host Y (100*b*) accordingly executes the restoration of the interrupt state of devices that are placed under the backup host Y (100*b*) (Step 1140). Specifically, the backup host Y (100*b*) refers to an interrupt bit of an interrupt register (not shown) to identify the cause of the interrupt, and then clears the interrupt bit.

In the case where a Tx that has not been completed has reached timeout, the backup host Y (100*b*) reissues this Tx (Step 1150).

After the restoration processing of these steps is completed, the backup host Y (100*b*) operates as a new active host Y (100*b*) (Step 1160).

A modification example of the first embodiment has now been described.

Second Embodiment

A second embodiment of this invention is described below.

A computer system in the second embodiment and its components including the hosts 100 and the multi-root PCI switch 200 have the same configurations as those in first embodiment. Descriptions of the components are therefore omitted here, and the focus is placed on differences from the first embodiment in the following description.

In the second embodiment, new items are added to the virtual switch group management table 510.

Figure 22:
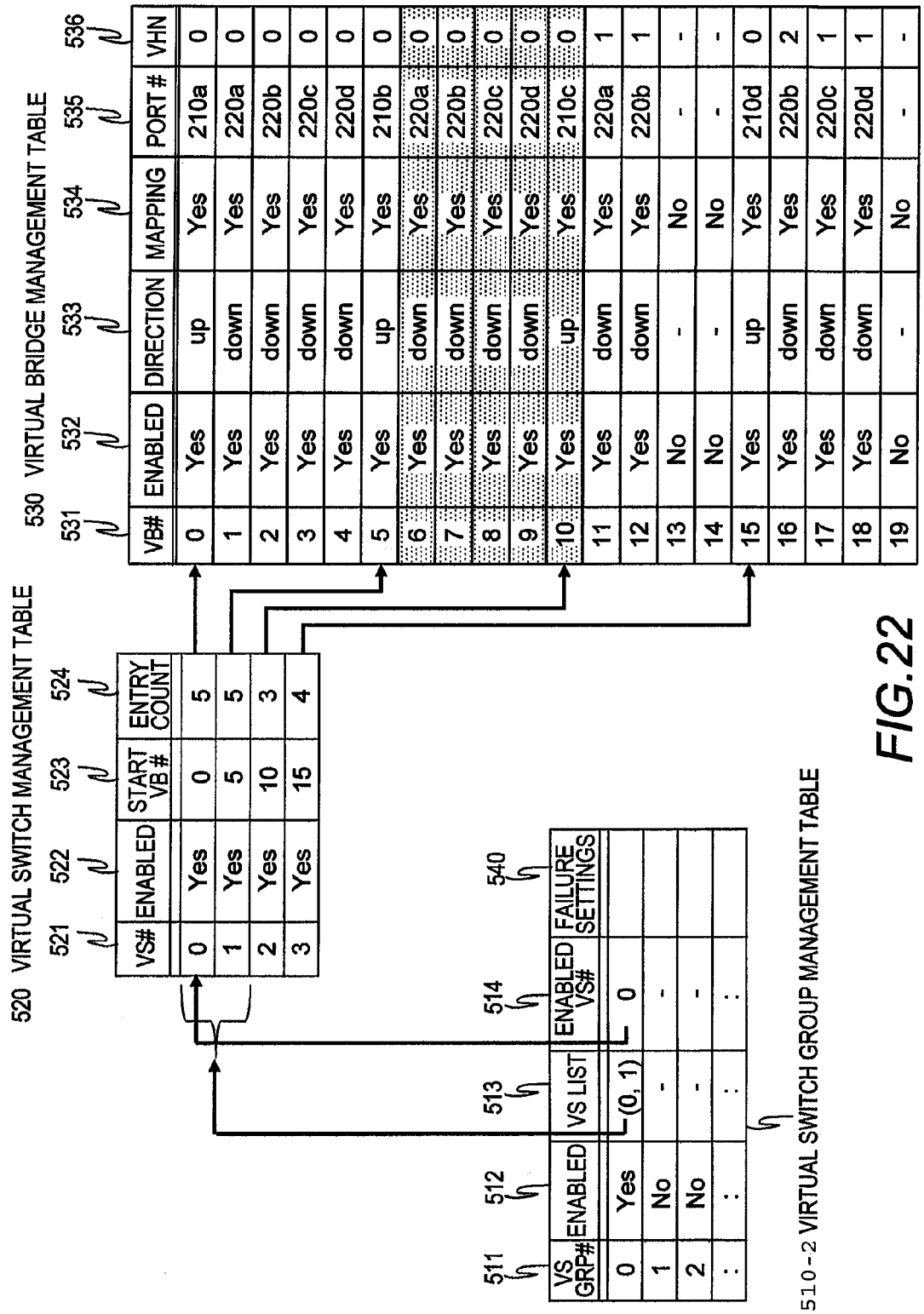
FIG. 22 is an explanatory diagram illustrating a virtual switch group management table according to a second embodiment of this invention.

FIG. 22 is an explanatory diagram illustrating a virtual switch group management table 510-2 according to the second embodiment of this invention.

As shown in FIG. 22, failure settings 540 are newly added to each entry in the virtual switch group management table 510-2.

The failure settings 540 are made up of itemized settings for automatically switching the virtual switches 400 upon detection of a failure by the multi-root PCI switch 200. Details of the failure settings 540 are described below.

Figure 23:
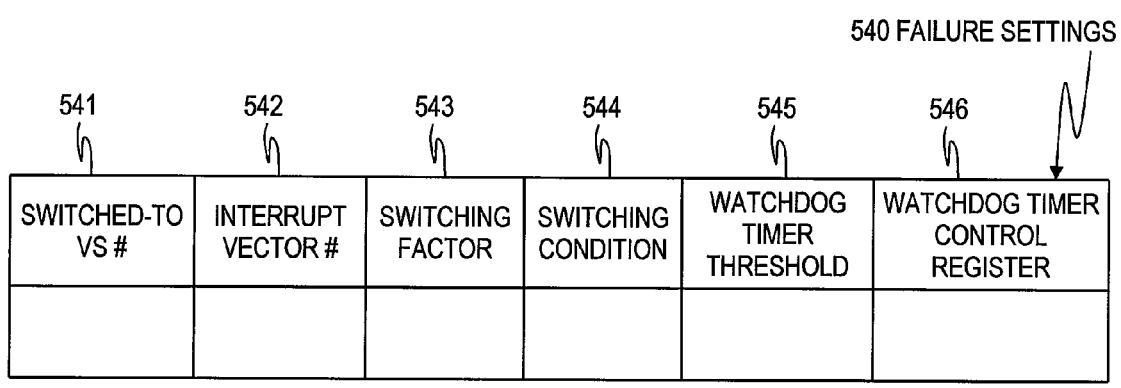
FIG. 23 is an explanatory diagram illustrating an example of the failure settings according to the second embodiment of this invention.

FIG. 23 is an explanatory diagram illustrating an example of the failure settings 540 according to the second embodiment of this invention.

The failure settings 540 include a switched-to virtual switch number (switched-to VS #) 541, an interrupt vector number (interrupt vector #) 542, a switching factor 543, a switching condition 544, a watchdog timer threshold 545, and a watchdog timer control register 546.

As the switched-to virtual switch number 541, there is stored the virtual switch number 521 of the virtual switch 400 to which switching is made upon failover. Specifically, the virtual switch number 521 on the virtual switch list 513 that is not registered as the enabled virtual switch number 514 is stored as the switched-to virtual switch number 541.

As the interrupt vector number 542, there is stored an identifier of an interrupt of which the backup host Y (100*b*) is notified when the virtual switches 400 are switched.

The switching factor 543 and the switching condition 544 are specified in the form of a bit map for each type of failure or reset that has caused the switching. The bit map set for each type of failure or reset that has caused the switching can be, for example, one described in the online document "Multi-Root I/O Virtualization and Sharing Specification Rev1.0" published by PCI-SIG in May 2008, pp. 109-222.

Conceivable switching factors include:
(1) the detection of reset in the virtual switches 400 that are used by the active host X (100*a*);
(2) timeout of a watchdog timer; and
(3) the detection of a failure in one of the virtual switches 400 that are used by the active host X (100*a*).

The watchdog timer is a counter that, once it starts counting, keeps counting up until it is cleared by the PCI manager 290 or the failover monitoring module 137 in the active host X (100*a*). The timer count is cleared periodically.

In the case where the count of the watchdog timer exceeds the preset watchdog timer threshold 545 before being cleared, this is interpreted as the indication of a failure in the active host X (100*a*), and an interrupt is made to notify that failover to the backup host Y (100*b*) is to be executed.

The watchdog timer control register 546 includes, among others, the current timer count, a count-up enabled/disabled control flag, a timer count clearing bit, and a flag indicating a timer count overflow.

Figure 24:
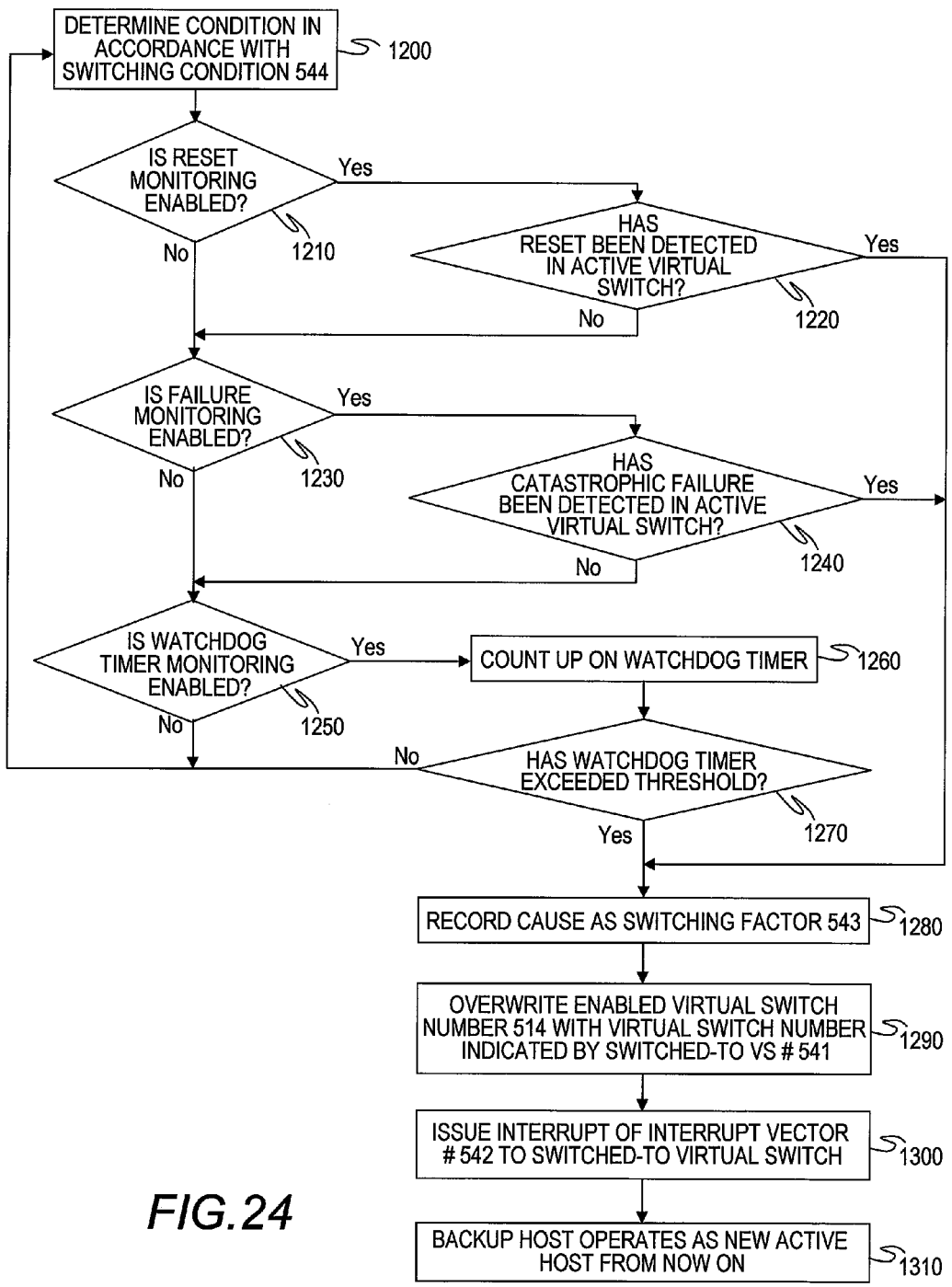
FIG. 24 is a flowchart illustrating processing that is executed when the multi-root PCI switch switches the virtual switches upon detection of a failure in the host X according to the second embodiment of this invention.

FIG. 24 is a flowchart illustrating processing that is executed when the multi-root PCI switch 200 switches the virtual switches 400 upon detection of a failure in the host X (100*a*) according to the second embodiment of this invention.

The multi-root PCI switch 200 determines a condition in accordance with conditions set as the switching condition 544 in the failure settings 540 (Step 1200).

The multi-root PCI switch 200 refers to the switching condition 544 to determine whether or not reset monitoring is enabled (Step 1210).

Determining that reset monitoring is enabled, the multi-root PCI switch 200 determines whether or not reset has been detected in the virtual switches 400 that are used by the active host X (100*a*) (hereinafter also referred to as active virtual switches 400) (Step 1220). The multi-root PCI switch 200 bases the determination on whether or not a reset notification from the active host X (100*a*) has been detected.

In the case where reset is detected in the active virtual switches 400, the multi-root PCI switch 200 proceeds to Step 1280.

In the case where reset is not detected in the active virtual switches 400, the multi-root PCI switch 200 proceeds to Step 1230.

When it is determined in Step 1210 that reset monitoring is not enabled, the multi-root PCI switch 200 refers to the switching condition 544 to determine whether or not failure monitoring is enabled (Step 1230).

Determining that failure monitoring is enabled, the multi-root PCI switch 200 determines whether or not a catastrophic failure that is irreparable has been detected in any one of the active virtual switches 400 (Step 1240).

In the case where a catastrophic failure that is irreparable has been detected in any one of the active virtual switches 400, the multi-root PCI switch 200 proceeds to Step 1280.

In the case where a catastrophic failure that is irreparable has not been detected in any one of the active virtual switches 400, the multi-root PCI switch 200 proceeds to Step 1250.

When it is determined in Step 1230 that failure monitoring is not enabled, the multi-root PCI switch 200 refers to the switching condition 544 to determine whether or not watchdog timer monitoring is enabled (Step 1250).

Determining that watchdog timer monitoring is not enabled, the multi-root PCI switch 200 returns to Step 1200 to continue monitoring.

Determining that watchdog timer monitoring is enabled, the multi-root PCI switch 200 counts up on the watchdog timer (Step 1260) and determines whether or not the count of the watchdog timer has exceeded the watchdog timer threshold 545 (Step 1270).

Determining that the count of the watchdog timer has not exceeded the watchdog timer threshold 545, the multi-root PCI switch 200 returns to Step 1200 to continue monitoring.

Determining that the count of the watchdog timer has exceeded the watchdog timer threshold 545, the multi-root PCI switch 200 proceeds to Step 1280.

In Step 1280, the multi-root PCI switch 200 records the cause of the switching as the switching factor 543.

The multi-root PCI switch 200 next overwrites the enabled virtual switch number 514 with the switched-to virtual switch number 541 set in advance (Step 1290).

The multi-root PCI switch 200 then uses a vector specified by the interrupt vector number 542 to issue an interrupt to the virtual switch 400 to which the switching is made in Step 1290 (Step 1300).

The backup host Y (100*b*) operates as a new active host Y (100*b*) from then on (Step 1310).

Figure 25:
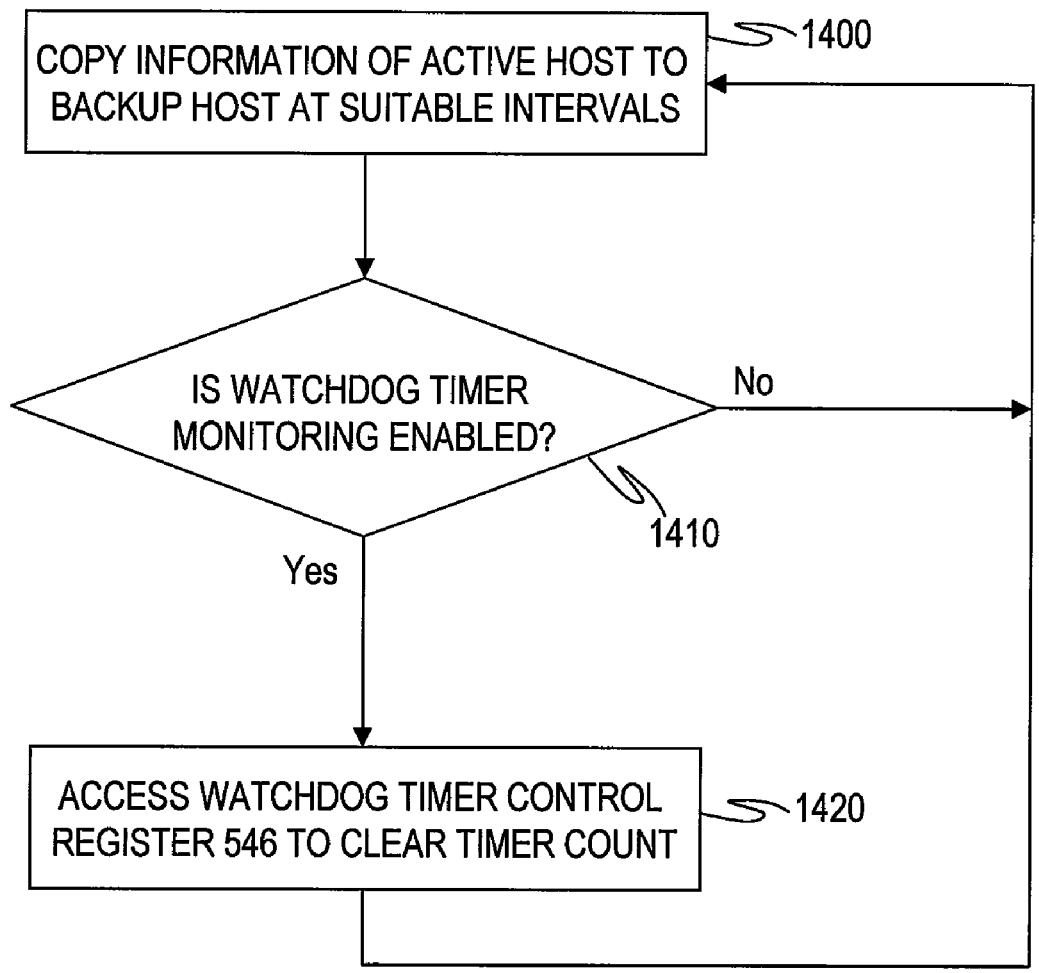
FIG. 25 is a flowchart illustrating processing that is executed by the active host X according to the second embodiment of this invention.

FIG. 25 is a flowchart illustrating processing that is executed by the active host X (100*a*) according to the second embodiment of this invention.

The active host X (100*a*) synchronizes with the backup host Y (100*b*) by copying information about the active host X (100*a*) to the backup host Y (100*b*) over the management network 270 at suitable intervals (Step 1400).

The active host X (100*a*) determines whether or not watchdog timer monitoring is enabled (Step 1410). The determination can be made by the same method that is used in Step 1250 of FIG. 24.

Determining that watchdog timer monitoring is not enabled, the active host X (100*a*) returns to Step 1400 to repeat the processing.

Determining that watchdog timer monitoring is enabled, the active host X (100*a*) periodically accesses the watchdog timer control register 546 in the failure settings 540 to clear the timer count (Step 1420), and returns to Step 1400 to repeat the processing. In this manner, the watchdog timer is prevented from overflowing while the active host X (100*a*) is in operation.

Figure 26:
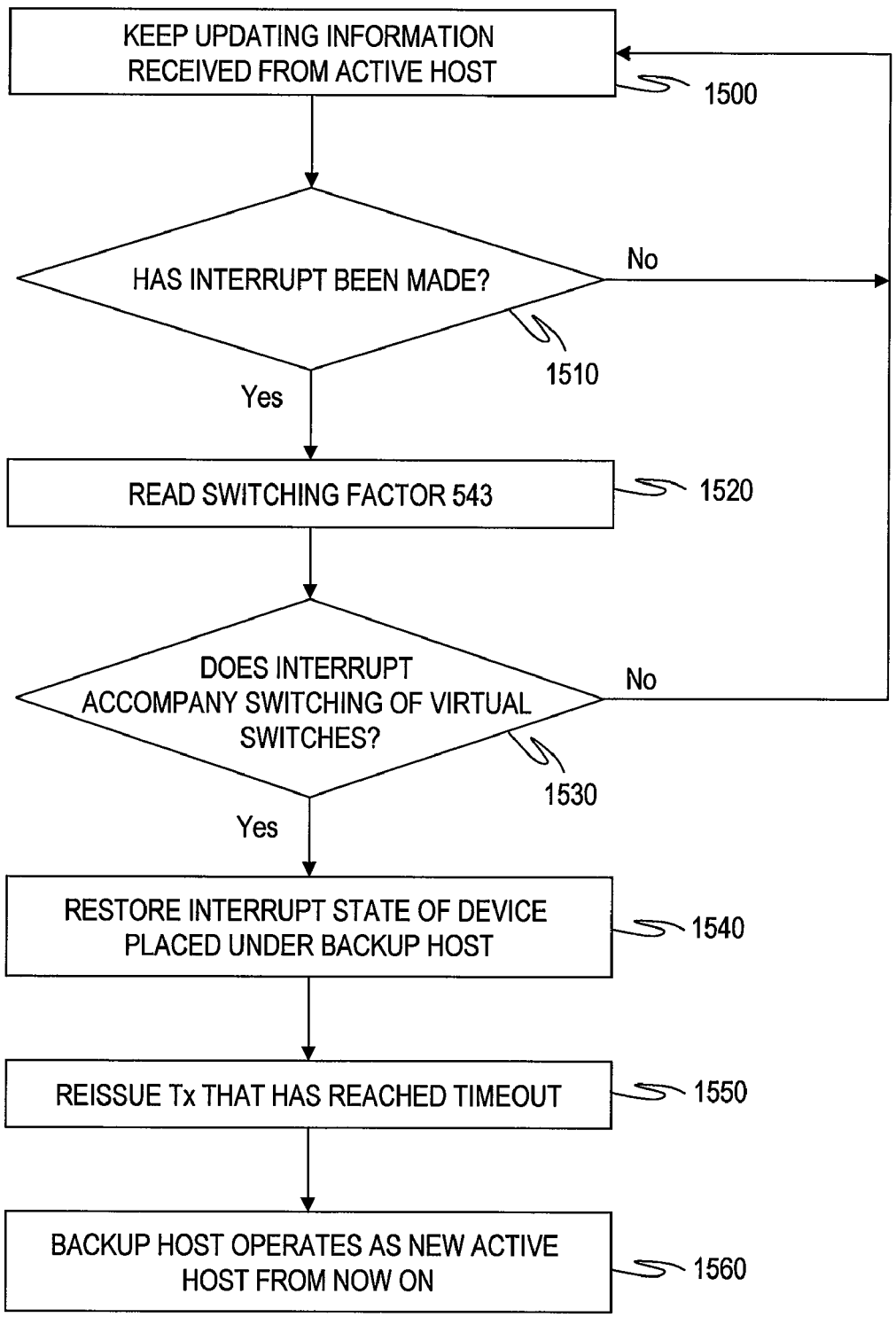
FIG. 26 is a flowchart illustrating processing that is executed by the backup host Y according to the second embodiment of this invention.

FIG. 26 is a flowchart illustrating processing that is executed by the backup host Y (100*b*) according to the second embodiment of this invention.

The backup host Y (100*b*) obtains information about the active host X (100*a*) from the active host X (100*a*) over the management network 270, and updates the information about the active host X (100*a*) at suitable intervals (Step 1500).

The backup host Y (100*b*) determines whether or not an interrupt has been made (Step 1510).

Determining that an interrupt has not been made, the backup host Y (100*b*) returns to Step 1500 to repeat the processing.

Determining that an interrupt has been made, the backup host Y (100*b*) reads the switching factor 543 (Step 1520). This interrupt contains at least the interrupt vector number 542.

The backup host Y (100*b*) determines from the interrupt vector number 542 and the switching factor 543 whether or not the cause of the interrupt is one that accompanies the switching of the virtual switches 400 (Step 1530).

Determining that the cause of the interrupt is not one that accompanies the switching of the virtual switches 400, the backup host Y (100*b*) returns to Step 1500 to repeat the processing. Causes of the interrupt that are not the switching of the virtual switches 400 are processed by other functions of the backup host Y (100*b*).

Determining that the cause of the interrupt is one that accompanies the switching of the virtual switches 400, the backup host Y (100*b*) restores the interrupt state of the devices that are placed under the backup host Y (100*b*) (Step 1540). The restoration can be performed by the same method that is used in Step 1140 of FIG. 21.

The backup host Y (100*b*) also reissues a Tx in the backup host Y (100*b*) that has reached timeout (Step 1550).

The backup host Y (100*b*) operates as a new active host Y (100*b*) from then on (Step 1560).

The second embodiment has now been described.

According to one embodiment of this invention, in switching over from an active host where the PCI manager 290 is currently running to a backup host, the virtual switches 400 can be switched without resetting the MR devices 300.

An interim state that deviates from the MR-IOV specifications and unintended resetting of the MR devices 300 can thus be avoided. This enables the new active host to take over the virtual switches 400 used by other hosts as they are after the takeover, and the other hosts are accordingly not affected.

According to another embodiment of this invention, it is possible to take over upon failure from an active host where the PCI manager 290 is currently running to a backup host, and the virtual switches can be switched without resetting the MR devices 300.

This keeps a failure in the active host from becoming a single point of failure, and prevents an interim state that deviates from the MR-IOV specifications and unintended resetting of the MR devices 300. A highly reliable computer system can be built in this manner.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
    a plurality of computers each comprising a processor, a memory connected to the processor, and an interface connected to the processor;
    a PCI switch which is connected to each of the plurality of computers via the interface; and
    a plurality of I/O devices which are connected to the PCI switch,
    wherein the PCI switch comprises:
    a plurality of ports to which one of the plurality of computers and the plurality of I/O devices are connected, respectively; and
    a switch management module for setting a communication path for connecting one of the plurality of computers and one of the plurality of I/O devices,
    wherein the communication path includes at least one of the virtual switches and at least one of a plurality of virtual bridges, the at least one of the virtual switches constituting paths including the communication paths which connect the at least one of the plurality of virtual bridges to each other, each of the plurality of virtual bridges connecting the at least one of the virtual switches and one of the plurality of ports, and
    wherein the switch management module comprises:
    a communication path generating module for setting the plurality of virtual switches and the plurality of virtual bridges to generate at least one of the communication paths from one of the set virtual switches and from one of the set plurality of virtual bridges;
    a virtual switch group management module for creating a virtual switch group including the plurality of virtual switches, and setting an enabled flag to one of the plurality of virtual switches included in the virtual switch group to indicate that connection with one of the plurality of ports is enabled; and a port management module for managing relation between each of the generated communication paths and at least one of the plurality of ports included in the each of the generated communication paths based on settings of the communication path generating module and settings of the virtual switch group management module, wherein the port management module is configured to:

in a case that the enabled flag is changed, change to a communication path which includes another one of virtual switches included in the virtual switch group before the change, from the communication path which includes the one of the virtual switches included in the virtual switch group before the change.

2. The computer system according to claim 1, wherein the enabled flag is associated with an identifier of the one of the plurality of virtual switches included in one of the generated communication paths that is actually used to connect one of the plurality of computers and one of the plurality of I/O devices, and wherein the port management module is configured to:

enable a connection between the communication path that includes the one of the plurality of virtual switches specified by the enabled flag and the plurality of ports; and disable connections between the communication path that include the plurality of virtual switches that are not specified by the enabled flag and the plurality of ports disabled as backup connection.

3. The computer system according to claim 1, wherein the virtual switch group includes a first virtual switch and a second virtual switch, wherein the enabled flag is associated with an identifier of the first virtual switch, and wherein, in a case where the virtual switch associated with the enabled flag is changed from the first virtual switch to the second virtual switch, the port management module is configured to:

disable a connection between the communication path that includes the first virtual switch and the plurality of ports; and enable a connection between the communication path that includes the second virtual switch to the plurality of ports.

4. The computer system according to claim 1, wherein the plurality of computers includes an active computer for managing the computer system, and a backup computer for taking over the active computer, wherein the computer system further comprises a failure monitoring module for monitoring the active computer for a failure, wherein the switch management module manages a first communication path for connecting the active computer and one of the plurality of I/O devices, and a second communication path for connecting the backup computer and the one of the plurality of I/O devices, and wherein the virtual switch group management module changes an identifier associated with the enabled flag from an identifier of one of the plurality of virtual switches that is included in the first communication path to an identifier of one of the plurality of virtual switches that is included in the second communication path, to thereby execute the takeover from the active computer to the backup computer.

5. The computer system according to claim 4, wherein the backup computer comprises the failure monitoring module, and wherein the backup computer requests the virtual switch group management module to change the identifier associated with the enabled flag from the identifier of the one of the plurality of virtual switches that is included in the first communication path to the identifier of the one of the plurality of virtual switches that is included in the second communication path in a case where detecting the failure in the active computer.

6. The computer system according to claim 4, wherein the PCI switch comprises the failure monitoring module, and wherein the PCI switch requests the virtual switch group management module to change the identifier associated with the enabled flag from the identifier of the one of the plurality of virtual switches that is included in the first communication path to the identifier of the one of the plurality of virtual switches that is included in the second communication path in a case where detecting the failure in the active computer.

7. The computer system according to claim 6, wherein the PCI switch notifies an interrupt to the backup computer in a case where the identifier associated with the enabled flag is changed from the identifier of the one of the plurality of virtual switches that is included in the first communication path to the identifier of the one of the plurality of virtual switches that is included in the second communication path.

8. A method of switching switches in a computer system that has a plurality of computers, a PCI switch and a plurality of I/O devices, the plurality of computers each having a processor, a memory which is connected to the processor, and an interface which is connected to the processor, the PCI switch being connected to each of the plurality of computers via the interface, the plurality of I/O devices being connected to the PCI switch, the PCI switch having a plurality of ports to which one of the plurality of computers and the plurality of I/O devices are connected, respectively, and a switch management module for setting a communication path for connecting one of the plurality of computers and one of the plurality of I/O devices, the communication path including at least one of the virtual switches constituting paths including the communication paths which connect the plurality of virtual bridges to each other, and the plurality of virtual bridges each connecting the one of the virtual switches to the plurality of ports, the switch management module having a communication path generating module for setting the plurality of virtual switches and the plurality of virtual bridges, a virtual switch group management module for creating a virtual switch group including the at least one of the virtual switches and managing the virtual switch group, and a port management module for managing a relation between each of the communication paths and at least one of the plurality of ports included in the each of the generated communication paths, the method including:

a first step of generating, by the communication path generating module, one of the plurality of set virtual switches and one of the plurality of set virtual bridges;

a second step of generating, by the communication path generating module, at least one of the communication paths from the generated one of the virtual switches and the generated one of the virtual bridges;

a third step of setting, by the virtual switch group management module, an enabled flag to one of the plurality of virtual switches included in the virtual switch group to indicate that connection with one of the plurality of ports is enabled;

a fourth step of determining, by the port management module, the relation between each of the communication paths and at least one of the plurality of ports included in the each of the generated communication paths based on settings of the communication path generating module and settings of the virtual switch group management module; and a fifth step of changing, by the port management module, in a case that the enabled flag is changed, to a communication path which includes another one of virtual switches included in the virtual switch group before the change, from the communication path which includes the one of the virtual switches included in the virtual switch group before the change.

9. The method of switching switches according to claim 8, wherein the enabled flag is associated with an identifier of the one of the plurality of virtual switches included in one of the generated communication paths that is actually used to connect one of the plurality of computers and one of the plurality of I/O devices, and wherein the fourth step including the steps of:

enabling, by the port management module, a connection between the communication path that includes the one of the plurality of virtual switches specified by the enabled flag and the plurality of ports; and disabling, by the port management module, connections between the communication path that includes the plurality of virtual switches that are not specified by the enabled flag and the plurality of ports disabled as backup connection.

10. The method of switching switches according to claim 8, wherein the virtual switch group includes a first virtual switch and a second virtual switch, wherein the enabled flag is associated with an identifier of the first virtual switch, and wherein the method further includes, in a case where the virtual switch associated with the enabled flag is changed from the first virtual switch to the second virtual switch:

disabling, by the port management module, a connection between the communication path that includes the first virtual switch and the plurality of ports; and enabling, by the port management module, a connection between the communication path that includes the second virtual switch to the plurality of ports.

11. The method of switching switches according to claim 8, wherein the plurality of computers includes an active computer for managing the computer system, and a backup computer for taking over the active computer, wherein the computer system further has a failure monitoring module for monitoring the active computer for a failure, wherein the method includes the steps of:

managing, by the switch management module, a first communication path for connecting the active computer and one of the plurality of I/O devices, and a second communication path for connecting the backup computer and the one of the plurality of I/O devices; and changing, by the virtual switch group management module, an identifier associated with the enabled flag from an identifier of one of the plurality of virtual switches that is included in the first communication path to an identifier of one of the plurality of virtual switches that is included in the second communication path.

12. The method of switching switches according to claim 11, wherein the backup computer has the failure monitoring module, and wherein the method further includes the steps of:

monitoring, by the backup computer, the active computer for the failure; and requesting, by the backup computer the virtual switch group management module to change the identifier associated with the enabled flag from the identifier of the one of the plurality of virtual switches that is included in the first communication path to the identifier of the one of the plurality of virtual switches that is included in the second communication path in a case where detecting the failure in the active computer.

13. The method of switching switches according to claim 11, wherein the PCI switch comprises the failure monitoring module, and wherein the method further includes the steps of:

monitoring, by the PCI switch, the active computer for the failure; and requesting, by the PCI switch the virtual switch group management module to change the identifier associated with the enabled flag from the identifier of the one of the plurality of virtual switches that is included in the first communication path to the identifier of the one of the plurality of virtual switches that is included in the second communication path in a case where detecting the failure in the active computer.

14. The method of switching switches according to claim 13, further including the step of notifying, by the PCI switch the backup computer of an interrupt in a case where the identifier associated with the enabled flag is changed from the identifier of the one of the plurality of virtual switches that is included in the first communication path to the identifier of the one of the plurality of virtual switches that is included in the second communication path.

15. A PCI switch for connecting a plurality of computers each having a processor, a memory connected to the processor, and an interface connected to the processor, to a plurality of I/O devices, the PCI switch comprising:

a plurality of ports to which one of the plurality of computers and the plurality of I/O devices are connected, respectively; and a switch management module for setting communication paths for connecting the plurality of computers and the plurality of I/O devices, wherein the communication path includes at least one of the virtual switches and at least one of a plurality of virtual bridges, the at least one of the virtual switches constituting paths including the communication paths which connect the one of the plurality of virtual bridges to each other, each of the plurality of virtual bridges connecting the at least one of the virtual switches and one of the plurality of ports, and wherein the switch management module comprises:

a communication path generating module for setting the plurality of virtual switches and the plurality of virtual bridges to generate at least one of the communication paths from one of the set virtual switches and from one of the plurality of set virtual bridges;

a virtual switch group management module for creating a virtual switch group including the plurality of virtual switches, and setting an enabled flag to one of the plurality of virtual switches included in the virtual switch group to indicate that connection with one of the plurality of ports is enabled; and a port management module for managing relation between each of the generated communication paths and at least one of the plurality of ports included in the each of the generated communication paths based on settings of the communication path generating module and settings of the virtual switch group management module, wherein the port management module is configured to:

in a case that the enabled flag is changed, change to a communication path which includes another one of virtual switches included in the virtual switch group before the change, from the communication path which includes the one of the virtual switches included in the virtual switch group before the change.

* * * * *